US008318634B2

(12) United States Patent
Ban et al.

(10) Patent No.: US 8,318,634 B2
(45) Date of Patent: Nov. 27, 2012

(54) THERMAL TRANSFER IMAGE-RECEIVING SHEETS

(75) Inventors: Yoshiaki Ban, Wakayama (JP); Eiji Shirai, Wakayama (JP); Nobumichi Kamiyoshi, Wakayama (JP); Yuuta Matsumoto, Wakayama (JP); Takashi Mukai, Wakayama (JP)

(73) Assignee: Kao Corporation, Tokyo (JP)

( * ) Notice: Subject to any disclaimer, the term of this patent is extended or adjusted under 35 U.S.C. 154(b) by 456 days.

(21) Appl. No.: 12/630,579

(22) Filed: Dec. 3, 2009

(65) Prior Publication Data

US 2010/0139013 A1 Jun. 10, 2010

(30) Foreign Application Priority Data

Dec. 5, 2008 (JP) ................................ 2008-311204
Apr. 6, 2009 (JP) ................................ 2009-092358

(51) Int. Cl.
*B41M 5/035* (2006.01)
*B41M 5/50* (2006.01)
*C08G 61/02* (2006.01)
*C08G 63/00* (2006.01)

(52) U.S. Cl. .......................... 503/227; 528/86; 528/176

(58) Field of Classification Search ........................ None
See application file for complete search history.

(56) References Cited

U.S. PATENT DOCUMENTS

| | | | | |
|---|---|---|---|---|
| 7,074,495 | B2 * | 7/2006 | Tamagawa et al. | ........ 428/537.5 |
| 2006/0275587 | A1 * | 12/2006 | Tamagawa et al. | ........ 428/195.1 |
| 2010/0028569 | A1 | 2/2010 | Kamiyoshi et al. | |

* cited by examiner

*Primary Examiner* — Bruce H Hess
(74) *Attorney, Agent, or Firm* — Oblon, Spivak, McClelland, Maier & Neustadt, L.L.P.

(57) ABSTRACT

The present invention relates to a resin for use in a thermal transfer image-receiving sheet which is excellent in dyeability with dyes and releasability of the sheet, a resin dispersion using the resin, and a thermal transfer image-receiving sheet. The resin for a thermal transfer image-receiving sheet is obtained by addition polymerizing and condensation polymerizing (a) raw monomers of a polyester, (b) a raw monomer of an addition polymer-based resin containing at least one compound selected from the group consisting of styrene and styrene derivatives and (c) at least one dually reactive monomer selected from the group consisting of acrylic acid, methacrylic acid and derivatives of these acids, wherein the raw monomers (a) of a polyester include an alcohol component containing 80 mol % or more of an alkyleneoxide adduct of 2,2-bis(4-hydroxyphenyl)propane.

17 Claims, No Drawings

THERMAL TRANSFER IMAGE-RECEIVING SHEETS

FIELD OF THE INVENTION

The present invention relates to a thermal transfer image-receiving sheet and a process for producing the thermal transfer image-receiving sheet.

BACKGROUND OF THE INVENTION

There has been proposed the method for forming color images on a thermal transfer image-receiving sheet which is dyeable with a sublimable dye by using a thermal transfer sheet composed of the sublimable dye as a recording agent and a substrate on which the sublimable dye is supported. In this method, the dye is heated using a thermal head of a printer as a heating means and transferred on the image-receiving sheet to obtain the color images. The thus formed images are very clear and excellent in transparency because of the dye used, and are therefore expected to provide high-quality images which are excellent in reproducibility of half tones and gradation.

In the thermal transfer image-receiving sheets, polyesters are used in a dye receptor layer thereof from the viewpoint of an excellent dyeability of the thermal transfer image-receiving sheets with dyes. It is known that an alkyleneoxide adduct of bisphenol A is employed as a raw monomer of the polyesters. For example, there is disclosed a thermal transfer image-receiving sheet in which a dye receptor layer contains a polyester resin produced from a dicarboxylic acid component containing 40 mol % or more of an alicyclic dicarboxylic acid compound and a diol component containing 15 mol % or more of a diol compound having a bisphenol A skeleton as a dye acceptable resin (JP 2002-19306A). On the other hand, there has been proposed a method in which a styrene resin or an acrylic resin is used in a dye receptor layer of a thermal transfer image-receiving sheet from the viewpoint of a good releasability of the sheet (JP 2002-283750A).

Further, there is known a technique in which a mixed resin of polyester and a thermoplastic resin such as polystyrene, or a resin having a main chain composed of a polyester having an unsaturated bond and a side chain composed of a polymer of a radical polymerizable unsaturated monomer is used in a dye receptor layer (JP 6-24156A and JP 10-60063A). In addition, there is disclosed a technique in which resins that are different in glass transition point from each other are used from the viewpoint of attaining a good image density (dyeability) (refer to JP 2007-229987A).

SUMMARY OF THE INVENTION

The present invention relates to the following aspects.

[1] A thermal transfer image-receiving sheet including a dye receptor layer containing a resin (A) obtained by addition polymerizing and condensation polymerizing (a) raw monomers of a polyester, (b) a raw monomer of an addition polymer-based resin containing at least one compound selected from the group consisting of styrene and styrene derivatives and (c) at least one compound selected from the group consisting of acrylic acid, methacrylic acid and derivatives of these acids, wherein the raw monomers (a) of a polyester include an alcohol component containing 80 mol % or more of an alkyleneoxide adduct of 2,2-bis(4-hydroxyphenyl)propane represented by the formula (I):

(I)

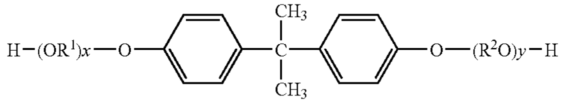

wherein $R^1O$ and $R^2O$ are respectively an oxyethylene group or an oxypropylene group; and x and y are respectively a positive number with the proviso that a sum of x and y is from 2 to 7 on the average, in which the $R^1O$ groups in the number of x may be the same or different and the $R^2O$ groups in the number of y may be the same or different.

[2] A process for producing the thermal transfer image-receiving sheet as defined in the above aspect [1], including the step of forming the dye receptor layer on a substrate using a coating solution containing the resin (A) as defined in the above aspect [1].

[3] A process for producing the thermal transfer image-receiving sheet as defined in the above aspect [1], including the steps of:

(1) forming an intermediate layer containing a water-soluble polymer and hollow particles on a substrate; and (2) forming the dye receptor layer on the intermediate layer using a coating solution containing the resin (A) as defined in the above aspect [1] and a resin (B) having a glass transition point that is different by 10 to 80° C. from that of the resin (A).

DETAILED DESCRIPTION OF THE INVENTION

The thermal transfer image-receiving sheet described in JP 2002-19306A is excellent in dyeability with dyes, but tends to be deteriorated in releasability of the sheet. The thermal transfer image-receiving sheet obtained by the method described in JP 2002-283750A tends to be deteriorated in dyeability with dyes, thereby failing to obtain a sufficient imaging performance. Further, the resin described in JP 6-24156A or JP 10-60063A fails to provide a thermal transfer image-receiving sheet that is excellent in both dyeability with dyes and releasability of the sheet. In addition, the technique described in JP 2007-229987A tends to be unsatisfactory to meet the recent market requirements. More specifically, in general, as the dyeability of the thermal transfer image-receiving sheet becomes higher, the releasability and light fastness thereof tend to be deteriorated. Therefore, no thermal transfer image-receiving sheet capable of satisfying all of high dyeability and releasability and further good light fastness has been presently obtained.

The present invention relates to a thermal transfer image-receiving sheet that is excellent in both of dyeability with dyes and releasability of the sheet, and a process for producing the thermal transfer image-receiving sheet.

In addition, the present invention relates to a thermal transfer image-receiving sheet that is excellent in all of dyeability, releasability and light fastness, and a process for producing the thermal transfer image-receiving sheet.

<Thermal Transfer Image-Receiving Sheet>

The thermal transfer image-receiving sheet of the present invention includes a dye receptor layer containing a resin (A) obtained by addition polymerizing and condensation polymerizing (a) raw monomers of a polyester, (b) a raw monomer of an addition polymer-based resin containing at least one compound selected from the group consisting of styrene and styrene derivatives and (c) at least one compound selected from the group consisting of acrylic acid, methacrylic acid and derivatives of these acids, wherein the raw monomers (a)

of a polyester include an alcohol component containing 80 mol % or more of an alkyleneoxide adduct of 2,2-bis(4-hydroxyphenyl)propane represented by the above formula (I).

The resin (A) is such a resin in which a polyester and an addition polymer-based resin is at least partially chemically bonded with each other. As described above, the resin (A) is obtained by addition polymerizing and condensation polymerizing the raw monomers (a) of a polyester including an alkyleneoxide adduct of 2,2-bis(4-hydroxyphenyl)propane represented by the above formula (I) and the raw monomer (b) of an addition polymer-based resin containing at least one compound selected from the group consisting of styrene and styrene derivatives in the presence of the at least one compound (c) selected from the group consisting of acrylic acid, methacrylic acid and derivatives of these acids (hereinafter referred to as a "dually reactive monomer").

The reason why the thermal transfer image-receiving sheet that is excellent in both of dyeability with dyes and releasability of the sheet can be produced by using the resin (A) is considered as follows, although it is not clearly determined. That is, it is considered that in the resin (A), for example, an end hydroxyl group of the polyester is reacted with a carboxyl group of the dually reactive monomer incorporated into the addition polymer-based resin to form a chemical bond therebetween, so that the addition polymer-based resin component is finely and uniformly dispersed in the polyester component. In this regard, the resin of the present invention is different from conventional grafted resins obtained by grafting a radical polymer-based resin to a side chain of the polyester which is formed by cleavage of an unsaturated bond in the polyester. As used herein, the dually reactive monomer in the resin (A) is regarded as a component of the addition polymer-based resin.

[Resin (A)]

((a) Raw Monomers of Polyester)

A polyester unit constituting the resin (A) is produced by using an alcohol component containing an alkyleneoxide adduct of 2,2-bis(4-hydroxyphenyl)propane represented by the above formula (I) as a raw material component.

In the general formula (I), $R^1O$ and $R^2O$ are respectively an oxyalkylene group, preferably each independently an oxyalkylene group having 1 to 4 carbon atoms, and more preferably an oxyethylene group or an oxypropylene group. Also, the $R^1O$ groups in the number of x and the $R^2O$ groups in the number of y may be respectively the same or different. From the viewpoints of dyeability of the thermal transfer image-receiving sheet with dyes and adhesion between an intermediate layer and the dye receptor layer, the $R^1O$ groups in the number of x and the $R^2O$ groups in the number of y are preferably respectively identical to each other.

The suffixes x and y each correspond to a molar number of addition of alkyleneoxides and are respectively a positive number. In addition, from the viewpoint of a good reactivity with a carboxylic acid component, a sum of x and y is preferably from 2 to 7, more preferably from 2 to 5 and even more preferably from 2 to 3 on the average.

Specifically, from the above viewpoints, the alkyleneoxide adduct of 2,2-bis(4-hydroxyphenyl)propane represented by the above formula (I) is preferably polyoxyethylene-2,2-bis (4-hydroxyphenyl)propane as a compound of the general formula (I) in which x and y lie within the above defined range, and $R^1O$ and $R^2O$ both are an oxyethylene group (hereinafter referred to merely as an "ethyleneoxide adduct") or polyoxypropylene-2,2-bis(4-hydroxyphenyl)propane as a compound of the general formula (I) in which x and y lie within the above defined range, and $R^1O$ and $R^2O$ both are an oxypropylene group (hereinafter referred to merely as a "propyleneoxide adduct"). These alkyleneoxide adducts of 2,2-bis(4-hydroxyphenyl)propane may be used alone or in combination of any two or more thereof.

The content of the propyleneoxide adduct in the alkyleneoxide adduct of 2,2-bis(4-hydroxyphenyl)propane represented by the above formula (I) is preferably from 50 to 100 mol %, more preferably from 60 to 100 mol %, even more preferably from 70 to 100 mol % and most preferably substantially 100 mol % from the viewpoints of a good releasability of the thermal transfer image-receiving sheet. The propyleneoxide adduct content is preferably used for the below-mentioned thermal transfer image-receiving sheet in which the intermediate layer containing a water-soluble polymer and hollow particles and the dye receptor layer are successively formed on a substrate, in particular, for the thermal transfer image-receiving sheet in which the dye receptor layer contains, in addition to the resin (A), a resin (B) having a glass transition point that is different by 10 to 80° C. from that of the resin (A). The propyleneoxide adduct may be partially substituted with the other oxyalkylene group unless the effects of the present invention are adversely affected. As the other oxyalkylene group, from the viewpoint of a good dyeability of the thermal transfer image-receiving sheet with dyes, preferred are an oxyethylene group and an oxytrimethylene group, and from the same viewpoint, more preferred is an oxyethylene group.

The content of the alkyleneoxide adduct of 2,2-bis(4-hydroxyphenyl)propane represented by the above formula (I) in the raw alcohol component is 80 mo % or more, preferably 90 mol % or more, and more preferably substantially 100 mol % from the viewpoints of a good releasability of the thermal transfer image-receiving sheet and a good dyeability thereof with dyes. Meanwhile, the "alkyleneoxide adduct" as used herein means a whole of an alcohol obtained by adding an oxyalkylene group to 2,2-bis(4-hydroxyphenyl)propane.

The alcohol component used as a raw material component of the polyester may also contain, in addition to the alkyleneoxide adduct of 2,2-bis(4-hydroxyphenyl)propane represented by the above formula (I), other known alcohol components. Examples of the other alcohol components include alkyleneoxide adducts of 2,2-bis(4-hydroxyphenyl)propane other than the alkyleneoxide adduct of 2,2-bis(4-hydroxyphenyl)propane represented by the above formula (I), ethylene glycol, propylene glycol (1,2-propanediol), glycerol, pentaerythritol, trimethylol propane, hydrogenated bisphenol A, sorbitol, and alkylene ($C_2$ to $C_4$) oxide adducts (average molar number of addition: 1 to 16) of these compounds. These other alcohol components may be used alone or in combination of any two or more thereof.

Specific examples of the carboxylic acid component as a raw material component of the polyester include dicarboxylic acids such as phthalic acid, isophthalic acid, terephthalic acid, cyclohexanedicarboxylic acid, fumaric acid, maleic acid, adipic acid, succinic acid and decalindicarboxylic acid; succinic acids substituted with an alkyl group having 1 to 20 carbon atoms or an alkenyl group having 2 to 20 carbon atoms such as dodecenyl succinic acid and octenyl succinic acid; trivalent or higher-valent polycarboxylic acids such as trimellitic acid and pyromellitic acid; and anhydrides and alkyl ($C_1$ to $C_3$) esters of these acids. The carboxylic acid component preferably contains an aromatic dicarboxylic acid from the viewpoints of a good releasability of the thermal transfer image-receiving sheet and a good dyeability of the thermal transfer image-receiving sheet with dyes. More specifically, phthalic acid, isophthalic acid, terephthalic acid, etc., are preferred.

From the same viewpoints as described above, the content of the aromatic dicarboxylic acid in the dicarboxylic acids contained in the carboxylic acid component as the raw monomer of the polyester is preferably 50 mol % or more, more preferably 70 mol % or more, even more preferably 90 mol % or more and most preferably substantially 100 mol %. These carboxylic acid components may be used alone or in combination of any two or more thereof.

In the present invention, from the viewpoint of a good releasability of the thermal transfer image-receiving sheet, as the above carboxylic acid component, there are preferably used trivalent or higher-valent carboxylic acids and anhydrides and alkyl ($C_1$ to $C_3$) esters of these acids. More specifically, preferred are trimellitic acid, pyromellitic acid and anhydrides and alkyl ($C_1$ to $C_3$) esters of these acids, and even more preferred are trimellitic acid and trimellitic anhydride. In the present invention, these trivalent or higher-valent carboxylic acids may be added after completion of the below-mentioned addition polymerization and polycondensation, and such a post-addition of the trivalent or higher-valent carboxylic acid is also preferable from the same viewpoints as described above.

The content of the trivalent or higher-valent carboxylic acids and anhydrides and alkyl ($C_1$ to $C_3$) esters of these acids in the whole carboxylic acid components is preferably from 10 to 40 mol %, more preferably from 10 to 35 mol % and even more preferably from 10 to 25 mol %.

In addition, from the viewpoint of a good dyeability of the thermal transfer image-receiving sheet with dyes, as the carboxylic acid component, there may be used the succinic acids containing an alkyl group and/or an alkenyl group. In the preferred form, there are used the succinic acids containing an alkyl group having 1 to 22 carbon atoms or an alkenyl group having 2 to 22 carbon atoms such as dodecenyl succinic acid and octenyl succinic acid, more specifically, the succinic acids containing a linear, branched or cyclic alkyl group having 8 to 22 carbon atoms and preferably 10 to 20 carbon atoms or a linear, branched or cyclic alkenyl group having 8 to 22 carbon atoms and preferably 10 to 20 carbon atoms.

Specific examples of the alkyl group contained in the succinic acid containing an alkyl group and/or an alkenyl group include various octyl groups, various decyl groups, various dodecyl groups, various tetradecyl groups, various hexadecyl groups, various octadecyl groups and various icosyl groups.

Specific examples of the alkenyl group contained in the succinic acid containing an alkyl group and/or an alkenyl group include various octenyl groups, various decenyl groups, various dodecenyl groups, various tetradecenyl groups, various hexadecenyl groups, various octadecenyl groups and various icosenyl groups.

The content of the succinic acid containing an alkyl group and/or an alkenyl group in the carboxylic acid component is preferably from 5 to 50 mol %.

Also, in the below-mentioned thermal transfer image-receiving sheet in which an intermediate layer containing a water-soluble polymer and hollow particles and the dye receptor layer, in particular, such a dye receptor layer containing, in addition to the resin (A), a resin (B) having a glass transition point that is different by 10 to 80° C. from that of the resin (A), are formed on a substrate, an alicyclic carboxylic acid and/or an aliphatic dicarboxylic acid are preferably used as the carboxylic acid component from the viewpoint of a good light fastness of the thermal transfer image-receiving sheet.

The raw monomers of the polyester, i.e., the alcohol component and the carboxylic acid component, are polycondensed, for example, in an inert gas atmosphere, if required, in the presence of an esterification catalyst. The temperature used in the above polycondensation is preferably from 150 to 250° C., more preferably from 170 to 240° C. and even more preferably from 175 to 240° C. from the viewpoints of reactivity and thermal decomposition of the raw monomers. From the viewpoints of a good releasability of the thermal transfer image-receiving sheet and a good dyeability of the thermal transfer image-receiving sheet with dyes, the raw monomers of the polyester preferably are polycondensed using an esterification catalyst. Examples of the esterification catalyst include tin catalysts, titanium catalysts, and metal compounds such as antimony trioxide, zinc acetate and germanium dioxide. Among these catalysts, from the viewpoint of a high reaction efficiency of the esterification reaction, preferred are tin catalysts and titanium catalysts. Among the tin catalysts, preferred are tin dibutyl oxide, tin dioctylate and salts thereof.

((b) Raw Monomer of Addition Polymer-Based Resin)

The raw monomer (b) of the addition polymer-based resin contains at least one compound selected from the group consisting of styrene and styrene derivatives.

As the addition polymer-based resin, vinyl-based resins obtained from radical polymerization reaction, etc., are preferred from the viewpoint of a high reactivity of the addition polymerization reaction. The raw monomer of the addition polymer-based resin contains at least one compound selected from the group consisting of styrene and styrene derivatives. Examples of the styrene derivatives include methyl styrene, α-methyl styrene, β-methyl styrene, t-butyl styrene, chlorostyrene, chloromethyl styrene, methoxystyrene, styrenesulfonic acid and salts thereof.

Among these raw monomers, styrene derivatives are preferred from the viewpoint of a good releasability of the thermal transfer image-receiving sheet, and styrene is preferred from the viewpoints of a low cost of the raw monomer and a good storage stability of the resin for the thermal transfer image-receiving sheet. The content of the styrene or styrene derivatives in the raw monomer of the addition polymer-based resin is preferably 55% by weight or more, more preferably 65% by weight or more and even more preferably 75% by weight or more from the viewpoints of a good releasability of the thermal transfer image-receiving sheet and a good storage stability of the resin for the thermal transfer image-receiving sheet.

Examples of the raw monomers of the addition polymer-based resin other than the styrene or styrene derivatives include ethylenically unsaturated monoolefins such as ethylene and propylene; diolefins such as butadiene; halovinyl compounds such as vinyl chloride; vinyl esters such as vinyl acetate and vinyl propionate; esters of ethylenic monocarboxylic acids such as alkyl ($C_1$ to $C_{18}$) esters of (meth)acrylic acid and dimethylaminoethyl (meth)acrylate; vinyl ethers such as vinyl methyl ether; vinylidene halides such as vinylidene chloride; and N-vinyl compounds such as N-vinyl pyrrolidone.

In the addition polymerization of the raw monomer of the addition polymer-based resin, there may be used, if required, any known agents such as a polymerization initiator and a crosslinking agent. The temperature used in the addition polymerization varies depending upon kinds of polymerization initiators used therein. When using dibutyl peroxide, etc., as the initiator, the temperature of the addition polymerization is preferably from 100 to 180° C. and more preferably from 140 to 170° C. in order to reduce a viscosity of the reaction system and conduct the addition polymerization reaction with a high efficiency.

((c) Dually Reactive Monomer)

The dually reactive monomer as used herein means a compound having both a carboxyl group and an ethylenically unsaturated bond in a molecule thereof, and contains at least one compound selected from the group consisting of acrylic acid, methacrylic acid and derivatives of these acids. Examples of the derivatives of acrylic acid and methacrylic acid include crotonic acid, tiglic acid, 2-pentenoic acid, 4-pentenoic acid, 2-methyl 2-pentenoic acid, 4-methyl 2-pentenoic acid, 2-hexenoic acid and 5-hexenoic acid. The use of such a dually reactive monomer enables production of the resin (A).

The amount of the dually reactive monomer (c) used in the present invention is preferably from 1 to 40 mol % and more preferably from 5 to 30 mol % on the basis of the carboxylic acid component as the raw monomer (a) of the polyester from the viewpoints of a good dispersibility of the addition polymer-based resin component in the polyester component and well-controlled addition polymerization reaction and polycondensation reaction.

(Production of Resin (A))

The resin (A) is obtained by addition polymerizing and condensation polymerizing the respective monomers including the raw monomers (a) of the polyester, the raw monomer (b) of the addition polymer-based resin and the dually reactive monomer (c). More specifically, according to the present invention, in addition to the raw monomers (a) of the polyester and the raw monomer (b) of the addition polymer-based resin, there is further used the dually reactive monomer (c) which is capable of reacting with both of the raw monomers (a) of the polyester and the raw monomer (b) of the addition polymer-based resin. As a result, in the resin (A), the polyester component and the addition polymer-based resin component are at least partially bonded to each other through the dually reactive monomer.

In the present invention, the polymerization for production of the resin (A) may be accomplished by carrying out the polycondensation reaction and the addition polymerization reaction in a common reaction vessel in a successive or parallel manner. The resin (A) is preferably produced by reacting the dually reactive monomer (c) with the raw monomer (b) of the addition polymer-based resin and then reacting a functional group derived from the dually reactive monomer incorporated into the addition polymer-based resin by the previous reaction, with an end hydroxyl group of an alcohol as the raw material of the polyester. As long as the resin (A) is produced by the above method, the times of initiation, proceeding and completion of the addition polymerization reaction and the polycondensation reaction are not particularly limited, and the reaction temperature and time of the respective reactions may be appropriately selected for proceeding and completion of these reactions. The polycondensation reaction and the addition polymerization reaction may be carried out under the conditions as described above.

The resin (A) is preferably produced by a process including the steps of (1) mixing the raw monomers (a) of the polyester which include an alcohol component containing 80 mol % or more of the alkyleneoxide adduct of 2,2-bis(4-hydroxyphenyl)propane represented by the above formula (I), the raw monomer (b) of the addition polymer-based resin containing at least one compound selected from the group consisting of styrene and styrene derivatives and at least one dually reactive monomer (c) selected from the group consisting of acrylic acid, methacrylic acid and derivatives of these acids with each other; (2) subjecting the resulting mixture mainly to addition polymerization reaction to obtain an addition polymer-based resin component containing a functional group derived from the dually reactive monomer; and (3) subjecting the raw monomers of the polyester and the addition polymer-based resin component containing a functional group derived from the dually reactive monomer mainly to polycondensation reaction to react the raw monomer (a) with the addition polymer-based resin component. Meanwhile, it is not necessary to carry out the addition polymerization and the polycondensation reaction independently of each other, and these reactions may be carried out in parallel with each other. However, in the step (2), the addition polymerization reaction is preferably mainly conducted, whereas in the step (3), the polycondensation reaction is preferably mainly conducted.

More preferably, the resin (A) is produced by the process in which the addition polymer-based resin component containing a functional group derived from the dually reactive monomer is first obtained by mainly conducting the addition polymerization reaction, and then the polyester component is then obtained by mainly conducting the polycondensation reaction, followed by reacting the functional group derived from the dually reactive monomer with the polyester component. In the resin (A) produced by such a process, the addition polymer-based resin component is finely and uniformly dispersed in the polyester resin component in a desired manner. Meanwhile, the term “mainly” as used herein means that the other reactions may be carried out either simultaneously or in parallel with the aimed reaction, unless the effects of the present invention are adversely affected (a similar expression has a similar meaning in the subsequent descriptions). In addition, the term “functional group derived from the dually reactive monomer” as used herein means a functional group that is derived from the dually reactive monomer, and is capable of undergoing a polycondensation reaction with the other functional group such as a carboxyl group and a hydroxyl group in the polyester.

The above process is more specifically carried out as follows. First, the raw monomer (b) of the addition polymer-based resin is mixed with the dually reactive monomer (c), and the resulting mixture is subjected mainly to addition polymerization reaction at a temperature of preferably from 100 to 180° C. and more preferably from 140 to 170° C., to obtain the addition polymer-based resin component containing the functional group derived from the dually reactive monomer. Thereafter, the thus obtained addition polymer-based resin component is mixed with the raw monomers (a) of the polyester, preferably further mixed with a catalyst, and after the reaction temperature is raised to preferably from 150 to 250° C., more preferably from 170 to 240° C. and even more preferably from 175 to 240° C., the reaction mixture is subjected mainly to polycondensation reaction to obtain the polyester component, followed by reacting the functional group derived from the dually reactive monomer in the addition polymer-based resin component with the polyester component. The raw monomers (a) of the polyester, the raw monomer (b) of the addition polymer-based resin and the dually reactive monomer (c) may also be initially mixed with each other.

Alternatively, the resin (A) may be produced by a process in which the polyester component is first obtained mainly by polycondensation reaction, and then the addition polymer-based resin component containing the functional group derived from the dually reactive monomer is formed mainly by addition polymerization reaction, followed by reacting the polyester component with the functional group derived from the dually reactive monomer in the addition polymer-based resin component.

The above process is more specifically carried out as follows. The raw monomers (a) of the polyester are mixed with each other preferably by further adding the catalyst thereto, and the resulting mixture is subjected mainly to polycondensation reaction at a temperature of preferably from 150 to 250° C. and more preferably from 170 to 240° C. to obtain the polyester component. After the reaction temperature is dropped to preferably from 100 to 180° C. and more preferably from 140 to 170° C., the raw monomer of the addition polymer-based resin and the dually reactive monomer are mixed with each other and the resulting mixture is subjected mainly to addition polymerization reaction to form the addition polymer-based resin component containing the functional group derived from the dually reactive monomer, followed by reacting the polyester component with the functional group derived from the dually reactive monomer in the addition polymer-based resin component.

In the present invention, the weight ratio of the raw monomers (a) of the polyester to a sum of the raw monomer (b) of the addition polymer-based resin and the dually reactive monomer (c) [(a)/[(b)+(c)]] is preferably from 20/80 to 80/20, more preferably from 30/70 to 80/20, even more preferably from 40/60 to 75/25 and further even more preferably from 50/50 to 70/30 in order to attain both a good dyeability with dyes and a good releasability of the thermal transfer image-receiving sheet. When the polyester component is present in a larger amount than the amount of the addition polymer-based resin component, the addition polymer-based resin component is more finely and more uniformly dispersed in the polyester component in a desired manner. The above weight ratio is considered to indicate a weight ratio of the polyester component to the addition polymer-based resin component.

The weight ratio of the raw monomer (b) of the addition polymer-based resin to the dually reactive monomer (c) [(b)/(c)] is preferably from 80/20 to 99/1, more preferably from 89/11 to 98/2, even more preferably from 93/7 to 97/3 and further even more preferably from 95/5 to 97/3 from the viewpoints of a good dispersibility of the addition polymer-based resin component in the polyester resin component and well-controlled reactions.

Meanwhile, the resin (A) may also contain the other resin components unless the effects of the present invention are adversely affected. Examples of the other resin unit include polyester units obtained by using terephthalic acid and/or an alkyleneoxide adduct of 2,2-bis(4-hydroxyphenyl)propane other than those represented by the formula (I) as the raw monomers; polycarbonate units; alkoxystyrene derivative units such as polymethoxystyrene units, polyethoxystyrene units and poly-t-butoxystyrene units; phenoxy-polyethylene glycol acrylate derivative units such as phenoxyethyl acrylate units and phenoxyethoxyethyl acrylate units; phenoxy-polyethylene glycol methacrylate derivative units such as phenoxyethyl methacrylate units and phenoxyethoxyethyl methacrylate units; and polyhydroxystyrene units. These unit may be in the form of a homopolymer unit or a copolymer unit with the other monomer. Among these units, from the viewpoint of a good dyeability with dyes, preferred are polyester units, phenoxy-polyethylene glycol acrylate units and phenoxy-polyethylene glycol methacrylate units.

(Resin (A))

The resin (A) preferably has a softening point of from 80 to 250° C. and more preferably from 120 to 250° C. from the viewpoints of a good releasability of the thermal transfer image-receiving sheet and a good dyeability of the thermal transfer image-receiving sheet with dyes. Also, from the viewpoints of good releasability and storage stability, the softening point of the resin (A) is preferably from 80 to 165° C.

The glass transition point of the resin (A) is preferably from −20 to 100° C., more preferably 50° C. or higher, and even more preferably from 50 to 85° C. The glass transition point of the resin (A) in the dye receptor layer containing the resins (A) and (B) is not particularly limited as long as the difference in glass transition point between the resins (A) and (B) lies within the range of from 10 to 80° C. from the viewpoint of obtaining the thermal transfer image-receiving sheet that is excellent in all of dyeability, releasability and light fastness as described later, and may be appropriately determined depending upon whether the resin (A) is used as a higher-glass transition point resin or a lower-glass transition point resin. In this case, more specifically, the glass transition point of the resin (A) is preferably from −20 to 100° C., more preferably from 0 to 80° C. and even more preferably from 25 to 70° C. When the resin (A) is used as a lower-glass transition point resin, the glass transition point of the resin (A) is preferably 45° C. or lower, more preferably from −20 to 45° C., even more preferably from 0 to 45° C. and further even more preferably from 25 to 45° C. Whereas, when the resin (A) is used as a higher-glass transition point resin, the glass transition point of the resin (A) is preferably 50° C. or higher, more preferably 50 to 100° C., even more preferably from 50 to 80° C. and further even more preferably from 50 to 70° C.

The acid value of the resin (A) is preferably from 10 to 40 mg KOH/g and more preferably from 15 to 30 mg KOH/g from the viewpoint of a good dispersibility of the resin in an aqueous medium.

The desired glass transition point, softening point and acid value of the resin (A) can be attained by adequately controlling kinds and blending ratios of the monomers used as well as reaction temperature and time used in the polycondensation.

In addition, from the viewpoint of a good film-forming property, etc., upon producing the thermal transfer image-receiving sheet, the number-average molecular weight of the resin (A) is preferably from 1,000 to 100,000 and more preferably from 2,000 to 8,000.

[Dye Receptor Layer]

Upon forming the dye receptor layer, the resin (A) may be used in the form of an organic solvent solution. However, in the present invention, the resin (A) is preferably used in the form of a resin dispersion prepared by dispersing the resin in an organic solvent or water.

The dispersion of the resin (A) is preferably obtained by dispersing the resin in an aqueous medium from the viewpoint of a good environmental compatibility.

(Dispersion of Resin (A))

In the present invention, the dye receptor layer containing the resin (A) may also contain optional resins other than the resin (A). Examples of the resins other than resin (A) include known resins usable in the dye receptor layer of the thermal transfer image-receiving sheet, e.g., polyolefin-based resins such as polypropylene, halogenated polymers such as polyvinyl chloride, vinyl polymers such as polyvinyl acetate and polyacrylic esters, polystyrene-based resins, copolymer-based resins of olefins such as ethylene and propylene with other vinyl monomers, cellulose-based resins such as cellulose diacetate, and polycarbonates.

In the present invention, the resin (A) is preferably present in the form of resin particles, if required, together with a releasing agent, etc., in the resin dispersion obtained by dispersing the resin in an aqueous medium from the viewpoint of good environmental compatibility. The content of the resin (A) in the whole resins constituting the dye receptor layer is preferably 70% by weight or more, more preferably 80% by weight or more, and most preferably 100% by weight from the viewpoint of a good dyeability of the thermal transfer image-receiving sheet with dyes.

The aqueous medium used for dispersing the resin (A) contains water as a main component, i.e., in an amount of 50% by weight or more. From the viewpoint of an environmental compatibility, the content of water in the aqueous medium is preferably 80% by weight or more, more preferably 90% by weight or more and most preferably 100% by weight. Examples of components other than water which may be contained in the aqueous medium include water-soluble organic solvents such as methanol, ethanol, isopropanol, butanol, acetone, methyl ethyl ketone and tetrahydrofuran.

The resin dispersion used in the present invention is preferably a resin dispersion to which an oxazoline group-containing compound (hereinafter occasionally referred to merely as an "oxazoline compound") is further added in order to improve a releasability (heat fusibility) between the thermal transfer image-receiving sheet and a transfer sheet containing a sublimable dye and enhance an image density and an image quality of the resulting images. In addition, the dye receptor layer preferably contains a crosslinked resin obtained by crosslinking at least a part of the resin (A) with at least a part of the oxazoline compound. The oxazoline compound-crosslinked resin is preferably produced by mixing the resin (A) and the oxazoline compound with each other in an aqueous medium and subjecting the resulting mixture to crosslinking reaction.

As the oxazoline compound used in the present invention, there may be used those compounds containing a plurality of oxazoline groups in a molecule thereof. Examples of the compounds containing a plurality of oxazoline groups in a molecule thereof include difunctional-type compounds such as 2,2-(1,3-phenylene)-bis 2-oxazoline and 2,2-(1,4-phenylene)-bis 2-oxazoline; and polyfunctional-type compounds (hereinafter referred to merely as "oxazoline polymers") obtained by polymerizing a polymerizable monomer containing an oxazoline group. Among these compounds, the oxazoline polymers are preferred from the viewpoint of a good crosslinking reactivity with the resin (A).

When using the oxazoline compound, it is considered that the crosslinking effect due to the reaction thereof with the resin (A) is effectively exhibited, and the crosslinking reaction is promoted, so that the molecular weight of the resin forming the resin dispersion is increased, thereby improving a releasability and a heat fusibility between the thermal transfer image-receiving sheet and the transfer sheet. The oxazoline polymers may be produced, for example, by polymerizing an oxazoline group-containing polymerizable monomer, and further optionally by copolymerizing the oxazoline group-containing polymerizable monomer with a polymerizable monomer containing no oxazoline group which is copolymerizable therewith.

Examples of the oxazoline group-containing polymerizable monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline and 2-isopropenyl-5-ethyl-2-oxazoline. These oxazoline group-containing polymerizable monomers may be used alone or in combination of any two or more thereof. Among these oxazoline group-containing polymerizable monomers, 2-isopropenyl-2-oxazoline is preferred because of good industrial availability.

Examples of the polymerizable monomer containing no oxazoline group include (meth)acrylic acid esters such as methyl (meth)acrylate, ethyl (meth)acrylate, n-butyl (meth) acrylate, isobutyl (meth)acrylate, t-butyl (meth)acrylate, cyclohexyl (meth)acrylate, 2-ethylhexyl (meth)acrylate, methoxy polyethylene glycol (meth)acrylate, lauryl (meth) acrylate, monoesters of (meth)acrylic acid and polyethylene glycol, 2-aminoethyl (meth)acrylate and salts thereof, and 1,2,2,6,6-pentamethyl piperidine (meth)acrylate; (meth) acrylic acid salts such as sodium (meth)acrylate and potassium (meth)acrylate; unsaturated nitriles such as acrylonitrile; unsaturated amides such as (meth)acrylamide and N-methylol (meth)acrylamide; vinyl esters such as vinyl acetate and vinyl propionate; vinyl ethers such as methyl vinyl ether and ethyl vinyl ether; α-olefins such as ethylene and propylene; halogen-containing α,β-unsaturated aliphatic hydrocarbons such as vinyl chloride, vinylidene chloride and vinyl fluoride; and α,β-unsaturated aromatic hydrocarbons such as styrene and divinyl benzene. These monomers may be used alone or in combination of any two or more thereof.

The oxazoline polymers preferably have a weight-average molecular weight of from 500 to 2,000,000 and more preferably from 1,000 to 1,000,000 from the viewpoints of a good crosslinking reactivity with the resin (A) and a good productivity.

In the present invention, the oxazoline compound may be used in the form of powder particles, but is preferably used in the form of a solution or dispersion prepared by dissolving or dispersing the oxazoline compound in an aqueous medium from the viewpoints of a good crosslinking reactivity with the resin (A) and a good productivity. When using the oxazoline compound in the form of a dispersion in an aqueous medium, the volume-median particle size ($D_{50}$) of the dispersed particles of the oxazoline compound is preferably from 0.02 to 1 μm and more preferably from 0.05 to 0.8 μm from the viewpoint of a good crosslinking reactivity with the resin (A). The "volume-median particle size ($D_{50}$)" as used herein means a particle size at which a cumulative volume frequency calculated on the basis of a volume fraction of particles from a smaller particle size side thereof is 50%, and may be measured by the below-mentioned method. As the aqueous medium in which the oxazoline compound is dispersed or dissolved, there may be used the same aqueous media as described previously.

Meanwhile, examples of ordinary commercial products of the oxazoline compound include "EPOCROSS WS SERIES" (water-soluble type) and "EPOCROSS K SERIES" (emulsion type) both available from Nippon Shokubai Co., Ltd.

The content of the oxazoline compound in the resin dispersion or the amount of the oxazoline compound added thereto is preferably from 0.1 to 30 parts by weight and more preferably from 1 to 20 parts by weight in terms of a solid content on the basis of 100 parts by weight of the resin (A) from the viewpoints of a good crosslinking reactivity with the resin (A) and a good productivity.

The addition of the oxazoline compound to the resin dispersion may be carried out by mixing the resin dispersion to which the oxazoline compound has not been added yet, with the oxazoline compound under the condition that the temperature of the reaction system is controlled to preferably from 20 to 100° C., more preferably from 60 to 100° C. and even more preferably from 70 to 98° C. More specifically, the resin dispersion to which the oxazoline compound has not been added yet is heated to the above temperature, and the oxazoline compound is heated to a temperature of from 20 to 100° C. and preferably from 70 to 98° C. and added to the resin dispersion.

The volume-median particle size ($D_{50}$) of the resin particles containing the resin (A) in the resin dispersion is preferably 1 μm or less, more preferably from 20 nm to 1 μm, even more preferably from 50 to 800 nm and further even more preferably from 80 to 500 nm from the viewpoint of a good film-forming property upon producing the thermal transfer image-receiving sheet.

From the viewpoint of a good dyeability of the thermal transfer image-receiving sheet with dyes, the content of the resin (A) in a solid component of the resin dispersion is preferably from 80 to 100% by weight, more preferably from 85 to 100% by weight and even more preferably from 90 to 100% by weight.

The solid component in the resin dispersion has a glass transition point of preferably from −20 to 100° C., more preferably from 40 to 80° C. and even more preferably from 50 to 75° C., and a softening point of preferably from 80 to 250° C., more preferably from 100 to 220° C. and even more preferably from 120 to 220° C. from the viewpoints of a good storage stability of the resin dispersion as well as a good storage stability and a good releasability of the thermal transfer image-receiving sheet obtained by using the resin dispersion. The number-average molecular weight of the solid component in the resin dispersion is substantially the same as that of the above resin (A).

The concentration of the solid component in the resin dispersion is preferably from 20 to 45% by weight, more preferably from 20 to 40% by weight, even more more preferably from 25 to 40% by weight and further even more preferably from 30 to 40% by weight from the viewpoint of a good productivity of the resin dispersion. In addition, the pH of the above resin dispersion as measured at 25° C. is preferably from 5 to 10, more preferably from 6 to 9 and even more preferably from 7 to 9 from the viewpoint of a good storage stability of the resin dispersion.

The resin dispersion may be produced by the process of dispersing the resin (A) and preferably by the process further including the step of adding the oxazoline compound to the resulting dispersion.

More specifically, the resin dispersion may be produced, for example, by the process including the steps of dissolving the resin (A) in a ketone-based solvent, adding a neutralizing agent to the resultant solution to ionize a carboxyl group contained in the resin (A), and then adding water to the thus neutralized solution, followed by removing the ketone-based solvent to convert the solution to an aqueous system. Even more specifically, using a reactor equipped with a stirrer, a reflux condenser, a thermometer, a dropping funnel and a nitrogen gas inlet tube, the solution prepared by dissolving the resin (A) in the ketone-based solvent is mixed with a neutralizing agent, etc., to ionize a carboxyl group contained therein (not required when the carboxyl group is already ionized), and then water is added to the obtained reaction solution, followed by removing the ketone-based solvent to convert the reaction solution to an aqueous system. The dissolution in the ketone-based solvent and addition of the neutralizing agent are usually conducted at a temperature not higher than a boiling point of the ketone-based solvent. Also, examples of the water used in the above method include deionized water.

Examples of the ketone-based solvent usable in the process include acetone, methyl ethyl ketone, diethyl ketone, dipropyl ketone, methyl isobutyl ketone and methyl isopropyl ketone. Among these ketone-based solvents, methyl ethyl ketone is preferred from the viewpoints of a good solubility of the resin therein and facilitated removal of the solvent.

Examples of the neutralizing agent include an aqueous ammonia solution, an aqueous solution of alkali such as sodium hydroxide, and amines such as allyl amine, isopropyl amine, diisopropyl amine, ethyl amine, diethyl amine, triethyl amine, 2-ethylhexyl amine, tri-n-octyl amine, t-butyl amine, sec-butyl amine, propyl amine, methylaminopropyl amine, dimethylaminopropyl amine, n-propanol amine, butanol amine, 5-amino-4-octanol, monoethanol amine, N,N-dimethyl ethanol amine, isopropanol amine, neopentanol amine, diglycol amine, piperazine, 3-ethoxypropyl amine, diisobutyl amine, 3-diethylaminopropyl amine, ethylene diamine, 1,3-diaminopropane, 1,2-diaminopropane, 1,6-diaminohexane, 1,9-diaminononane, 1,12-diaminododecane, dimerized aliphatic acid diamines and 2,2,4-trimethylhexamethylene diamine. Among these neutralizing agents, preferred is an aqueous ammonia solution from the viewpoints of good emulsification of the resin and volatility of the solvent. The neutralizing agent may be used in such an amount capable of neutralizing an acid value of resins including at least the resin (A).

(Dye Receptor Layer)

The dye receptor layer may be formed by applying a coating solution containing the resin dispersion onto a substrate, for example, by a gravure printing method, a screen printing method, a reverse roll coating method using a gravure printing plate, etc., and drying the obtained coating layer. The thickness of the thus formed dye receptor layer is generally from 1 to 50 μm, and preferably from 3 to 15 μm from the viewpoints of a good image quality and a good productivity. In addition, the solid content in the coating layer after dried is preferably from 3 to 15 g per 1 $m^2$ of the obtained dye receptor layer.

The coating solution for forming the dye receptor layer preferably contains, in addition to the resin dispersion, a releasing agent from the viewpoint of further enhancing a releasability of the thermal transfer image-receiving sheet upon the thermal transfer. As the releasing agent, there may be preferably used, for example, a water-dispersible or water-soluble modified silicone oil and/or a colloid solution of fine particles of a silicic anhydride (e.g., colloidal silica), etc. The weight-average particle size of the fine particles of the silicic anhydride dispersed in the colloid solution is preferably 100 nm or less and more preferably 20 nm or less from the viewpoint of a good dispersibility thereof in the thermal transfer image-receiving sheet. Further, the coating solution may contain, in addition to the above releasing agent, the other releasing agent such as polyethylene and polypropylene. The content of these releasing agents in the coating solution is from 0.1 to 20 parts by weight and preferably from 0.5 to 10 parts by weight on the basis of 100 parts by weight of resins including the resin (A) from the viewpoints of a good releasability of the thermal transfer image-receiving sheet and a good dyeability of the thermal transfer image-receiving sheet with dyes.

In addition, the coating solution for the dye receptor layer preferably contains a film-forming agent, and the resulting dye receptor layer also preferably contains the film-forming agent. Among the film-forming agents, from the viewpoint of a strength of the obtained thermal transfer image-receiving sheet, preferred are butyl carbitol acetate, diethyl carbitol and water-soluble polymers, and when using the resin dispersion prepared by dispersing the resin in water, more preferred are water-soluble polymers. Specific examples of the water-soluble polymers include gelatin, polyvinyl alcohol and polyvinyl pyrrolidone. Among these water-soluble polymers, gelatin is preferred from the viewpoint of thermal properties thereof. The viscosity (at 60° C.) of the gelatin is preferably from 1.5 to 6.0 mPa·s, more preferably from 2.4 to 5.5 mPa·s and even more preferably from 3.0 to 5.5 mPa·s as measured according to JIS K6503-2001 from the viewpoints of a good releasability of the thermal transfer image-receiving sheet and a good film-forming property of the coating solution.

When using the gelatin in the dye receptor layer, the isoionic point of the gelatin is preferably lower than the pH value (25° C.) of the resin dispersion before adding the gelatin thereto from the viewpoints of a good stability of the coating solution for the dye receptor layer and a good strength of the resulting thermal transfer image-receiving sheet. When the isoionic point of the gelatin is lower than the pH value of the resin dispersion, it is considered that the resin exhibits an excellent dispersibility in the resin dispersion, and the resin dispersion maintains a good film-forming property, resulting in excellent strength of the resulting thermal transfer sheet. From the same viewpoints as described above, the isoionic point of the gelatin is preferably from 3 to 7, more preferably from 3.5 to 7, even more preferably from 3.5 to 6 and further even more preferably from 3.5 to 5.5. The isoionic point of the gelatin may be measured by the below-mentioned method.

From the viewpoint of preventing occurrence of cracks or peeling upon printing, the jelly strength of the gelatin is preferably from 150 to 300. When the jelly strength of the gelatin is 150 or more, the surface of printed images is prevented from suffering from occurrence of cracks or peeling owing to heat or pressure applied by a thermal head, and when the jelly strength of the gelatin is 300 or less, the coating solution for the dye receptor layer exhibits an adequate viscosity, resulting in a good coatability thereof. Therefore, the jelly strength of the gelatin is more preferably from 160 to 300, even more preferably from 190 to 300 and further even more preferably from 200 to 300. The jelly strength of the gelatin may be measured by the method according to JIS K6503.

The content of the film-forming agent such as water-soluble polymers in the dye receptor layer is preferably from 1 to 75% by weight and more preferably from 1 to 50% by weight on the basis of a total weight of the dye receptor layer from the viewpoints of a good film-forming property, a strength of the resulting thermal transfer image-receiving sheet and a coatability of the coating solution for the dye receptor layer.

The coating solution may also preferably contain a pigment or a filler such as titanium oxide, zinc oxide, kaolin clay, calcium carbonate and silica fine particles from the viewpoint of enhancing a whiteness of the dye receptor layer and a clarity of transferred images. The content of the pigment or filler in the coating solution is from 0.1 to 20 parts by weight and preferably from 0.1 to 10 parts by weight on the basis of 100 parts by weight of resins including the resin (A) from the viewpoint of a good whiteness of the thermal transfer image-receiving sheet.

The coating solution for the dye receptor layer may further contain, if required, other additives such as, for example, a crosslinking agent, a curing agent and a catalyst.

Meanwhile, the coating solution for the dye receptor layer preferably contains no surfactant from the viewpoints of allowing the resin (A) to show a self-dispersibility and enhancing a hydrophobic property of the thermal transfer image-receiving sheet.

The dye receptor layer of the thermal transfer image-receiving sheet according to the present invention can be produced from the coating solution having a solution configuration obtained by dissolving the resin in an organic solvent, or a dispersion configuration containing the resin dispersion obtained by dispersing the resin in an organic solvent or water as described above. Form the viewpoint of a good environmental compatibility, the latter dispersion configuration is preferred.

As the solvent for dissolving the resin, from the viewpoints of a good dissolvability of the resin and a good volatility of the solvent upon drying, preferred are methyl ethyl ketone and toluene, and more preferred is a mixed solvent of toluene and methyl ethyl ketone.

As the method of producing the resin solution by dissolving the resin in an organic solvent, there may be used the method of mixing the resin and the organic solvent with each other and then stirring the resulting mixture at an ordinary temperature or under heating for dissolving the resin in the solvent.

[Thermal Transfer Image-Receiving Sheet]

The present invention relates to a thermal transfer image-receiving sheet including a substrate and the dye receptor layer containing the resin (A). More specifically, the present invention relates to a thermal transfer image-receiving sheet including the dye receptor layer containing the resin (A) which is obtained by the process including the steps of (1) mixing specific raw monomers (a) of a polyester, a raw monomer (b) of an addition polymer-based resin containing at least one compound selected from the group consisting of styrene and styrene derivatives and at least one compound (c) selected from the group consisting of acrylic acid, methacrylic acid and derivatives of these acids with each other; (2) subjecting the resulting mixture mainly to addition polymerization reaction to obtain an addition polymer-based resin component containing a functional group derived from the compound (c); and (3) subjecting the raw monomers of a polyester and the addition polymer-based resin component containing a functional group derived from the compound (c) mainly to polycondensation reaction.

The resin (A) and the process for producing the resin (A) are the same as described above. Also, the dye receptor layer is also the same as described above.

In addition, the present invention also relates to a thermal transfer image-receiving sheet including a substrate, and an intermediate layer containing a water-soluble polymer and hollow particles and the above dye receptor layer containing the resin (A) which are successively formed on the substrate in this order.

More specifically, the thermal transfer image-receiving sheet of the present invention is preferably obtained by the method of forming the intermediate layer and the dye receptor layer on at least one surface of the substrate in this order by applying the respective coating solutions, for example, by a gravure printing method, a screen printing method, a reverse roll coating method using a gravure printing plate, etc, in an overlapped manner and then drying the resulting coating layers.

(Intermediate Layer)

The thermal transfer image-receiving sheet of the present invention preferably includes an intermediate layer containing a water-soluble polymer and hollow particles which is formed on the dye receptor layer.

Water-Soluble Polymer

The water-soluble polymer is used as a binder for fixing the hollow particles. Examples of the water-soluble polymer include gelatin, polyvinyl alcohol and polyvinyl pyrrolidone. Among these water-soluble polymers, gelatin is preferred from the viewpoint of thermal properties thereof. The viscosity (at 60° C.) of the gelatin is preferably from 2.5 to 6.0 mPa·s and more preferably from 3.0 to 5.5 mPa·s as measured according to JIS K6503-2001 from the viewpoints of a good releasability of the thermal transfer image-receiving sheet and a good film-forming property of the coating solution.

From the viewpoint of preventing occurrence of cracks or peeling upon printing, the jelly strength of the gelatin is preferably from 150 to 300. When the jelly strength of the gelatin is 150 or more, the surface of printed images is prevented from suffering from occurrence of cracks or peeling owing to heat or pressure applied by a thermal head, and when the jelly strength of the gelatin is 300 or less, the coating solution for the intermediate layer exhibits an adequate viscosity, resulting in a good coatability thereof. Therefore, the jelly strength of the gelatin is more preferably from 160 to 300, even more preferably from 190 to 300 and further even more preferably from 200 to 300. The jelly strength of the gelatin may be measured according to JIS K6503.

The content of the water-soluble polymer in the intermediate layer is preferably from 1 to 75% by weight and more preferably from 1 to 50% by weight on the basis of a total weight of the intermediate layer.

The water-soluble polymer contained in the intermediate layer is preferably crosslinked with a crosslinking agent such as aldehydes, epoxy compounds, vinyl sulfones, triazines and carbodimides. The water-soluble polymer contained in the intermediate layer may be the same as or different from the water-soluble polymer contained in the dye receptor layer. From the viewpoint of a good adhesion between the intermediate layer and the dye receptor layer, the water-soluble polymer contained in at least one of the intermediate layer and the dye receptor layer is preferably gelatin, and the water-soluble polymers contained in both the layers are more preferably gelatin.

Hollow Particles

The hollow particles contained in the intermediate layer are not particularly limited as long as they are polymer particles having voids in at least a part thereof. Examples of the hollow particles include 1) non-foamed type hollow particles formed by evaporating water present within an outer particle wall made of a resin after applying and drying the coating solution to thereby render an inside of each particle hollow; 2) hollow particles formed by heating particles obtained by coating a low-boiling point liquid such as butane and pentane with a resin to swell the low-boiling point liquid within the respective particles and thereby render an inside of each particle hollow; 3) hollow polymer particles formed by previously heating and foaming the particles obtained in the above 2); and 4) hollow particles formed by neutralizing at least a part of acid groups contained in a polymer forming the resin particles. In the present invention, among these hollow particles, from the viewpoints of a good dyeability with dyes and a good adhesion between the intermediate layer and the dye receptor layer, the hollow particles obtained by the method 1) or 3) are preferably used.

The material constituting the hollow particles is not particularly limited, and there may be employed various known materials usable in the above method. Examples of the material constituting the hollow particles include acrylic resins such as polyacrylic acid, polyacrylic acid esters, styrene-acryl copolymers and mixtures thereof, as well as polystyrene, polyvinylidene chloride, polyacrylonitrile and vinylidene chloride-acrylonitrile copolymers. In the present invention, from the viewpoints of a good dyeability with dyes and a good adhesion between the intermediate layer and the dye receptor layer, styrene-acryl copolymers and vinylidene chloride-acrylonitrile copolymers are preferably used.

The shape of the hollow particles is not particularly limited, and may be a spherical shape or any other non-spherical shape. In the present invention, from the viewpoint of a good adhesion between the intermediate layer and the dye receptor layer, the hollow particles preferably have a substantially spherical shape. The volume-median particle size ($D_{50}$) of the hollow particles is from 0.1 to 5 μm. From the viewpoint of a good adhesion between the intermediate layer and the dye receptor layer, the volume-median particle size ($D_{50}$) is preferably from 0.3 to 3 μm and more preferably from 0.3 to 1 μm. The volume-median particle size ($D_{50}$) of the hollow particles may be measured by a field emission-type scanning electron microscope "S-4800 Model" available from Hitachi Limited.

The hollow particles used in the present invention preferably have a methyl ethyl ketone (MEK) insoluble content of 70% by weight or less. From the viewpoints of a good dyeability with dyes and a good adhesion between the intermediate layer and the dye receptor layer, the MEK insoluble content of the hollow particles is more preferably from 10 to 70% by weight and even more preferably from 30 to 70% by weight. The term "MEK insoluble content" as used herein is defined by a weight ratio of insoluble hollow particle components to the whole hollow particles as measured by dissolving 2,000 parts by weight of the hollow particles in 95 parts by weight of MEK at 25° C.

The MEK insoluble content of the hollow particles may be suitably adjusted, for example, by controlling a crosslinking degree of the resin constituting the hollow particles.

In the present invention, the hollow particles are preferably used in the form of a dispersion in an aqueous medium. Examples of commercially available hollow particles preferably used in the present invention include "Nipol MH8101" available from Zeon Corporation, and "SX8782(D)" available from JSR Corporation.

From the viewpoints of a good dyeability with dyes and a good adhesion between the intermediate layer and the dye receptor layer, the intermediate layer contains the hollow particles in such an amount that the weight ratio of the hollow particles to the water-soluble polymer contained in the intermediate layer (hollow particles/water-soluble polymer) is preferably from 30/70 to 70/30, more preferably from 40/60 to 70/30 and even more preferably from 50/50 to 70/30.

Intermediate Layer

The intermediate layer may contain a pigment or a filler such as titanium oxide, zinc oxide, kaolin clay, calcium carbonate and silica fine particles from the viewpoint of enhancing a whiteness of the intermediate layer and a clarity of transferred images. The content of the pigment or filler in the intermediate layer is preferably from 0.1 to 20 parts by weight and more preferably from 0.1 to 10 parts by weight on the basis of 100 parts by weight of water-soluble polymer contained in the intermediate layer from the viewpoint of a good whiteness of the thermal transfer image-receiving sheet.

The intermediate layer may further contain, if required, various additives such as a film-forming agent such as glycol ethers, a releasing agent, a curing agent and a catalyst.

The intermediate layer in the thermal transfer image-receiving sheet of the present invention may be formed by applying a coating solution prepared by dispersing or dissolving the hollow particles and the water-soluble polymer, if required, together with various optional additives, in an organic solvent or water, onto at least one surface of a substrate for the thermal transfer image-receiving sheet, and then drying the resulting coating layer.

The thickness of the intermediate layer is preferably from 10 to 100 μm and more preferably from 20 to 50 μm from the viewpoints of a good cushioning property and a good heat-insulating property. The solid content of the intermediate layer after drying is preferably from 7 to 70 $g/m^2$ per 1 $m^2$ of the intermediate layer. The intermediate layer may be formed, for example, by applying a coating solution prepared by dispersing or dissolving the water-soluble polymer including gelatin and the hollow particles, if required, together with various optional additives, in water, onto at least one surface of a substrate for the thermal transfer image-receiving sheet, for example, by a gravure printing method, a screen printing method, a reverse roll coating method using a gravure printing plate, etc., and drying the obtained coating layer.

(Dye Receptor Layer on Intermediate Layer)

The dye receptor layer on the intermediate layer is preferably formed by applying a coating solution containing the resin dispersion prepared by dispersing the resin (A) in an aqueous medium onto the intermediate layer and then drying the resulting coating layer. The resin dispersion used above may be the same as described previously, and preferably the above-mentioned oxazoline group-containing compound is further added thereto.

From the viewpoint of satisfying all of a dyeability, a releasability and a light fastness, the dye receptor layer preferably contains, in addition to the resin (A), a resin (B) having a glass transition point that is different by 10 to 80° C. from that of the resin (A).

At least one of the two resins that are different in glass transition point from each other is the resin (A), but both thereof may be constituted from the resin (A). The resin (B) as the resin other than the resin (A) is not particularly limited as long as the difference in glass transition point between the two resins lies within the above-specified temperature range. From the viewpoints of good dyeability, releasability and light fastness of the thermal transfer image-receiving sheet, when any of the resins is a resin having a lower glass transition point or a resin having a higher glass transition point, the glass transition point of one of the resins preferably has the above-mentioned temperature range. More specifically, from the viewpoints of a good dyeability with dyes and a good light fastness of the thermal transfer image-receiving sheet, the resin having a lower glass transition point preferably has a glass transition point of 45° C. or lower, more preferably from −20 to 45° C., even more preferably from 0 to 45° C. and further even more preferably from 25 to 45° C. Whereas, from the viewpoint of a good releasability of the thermal transfer image-receiving sheet, the resin having a higher glass transition point preferably has a glass transition point of 50° C. or higher, more preferably from 50 to 100° C., even more preferably from 50 to 80° C. and further even more preferably from 50 to 70° C.

Specific examples of the resin (B) include vinyl chloride polymers, vinyl chloride-vinyl acetate copolymers, vinyl chloride-acryl copolymers and polyurethane. Among these resins, vinyl chloride-acryl copolymers are preferred from the viewpoints of good dyeability and light fastness of the thermal transfer image-receiving sheet and a good dispersibility of the resin dispersion.

These resins may be used in the form of an organic solvent solution similarly to the resin (A), but is preferably used in the form of a resin dispersion from the viewpoint of a good environmental compatibility, etc.

From the viewpoints of good releasability, dyeability and light fastness of the thermal transfer image-receiving sheet, the contents of the two resins in the dye receptor layer which are different in glass transition point from each other are controlled such that the weight ratio of the higher glass transition point resin to the lower glass transition point resin (higher glass transition point resin/lower glass transition point resin) is preferably from 90/10 to 50/50, more preferably from 90/10 to 60/40 and even more preferably from 90/10 to 70/30.

According to the conventional techniques, the releasability can be accomplished by using the higher glass transition point resin, but there is the problem that the use of the higher glass transition point resin sacrifices the dyeability and light fastness. On the contrary, the dyeability and light fastness can be accomplished by using the lower glass transition point resin, but there is the problem that the used of the lower glass transition point resin sacrifices the releasability. In the present invention, the two kinds of resins whose glass transition points are different by 10 to 80° C. from each other are preferably used in the dye receptor layer as described previously. As a result, an excellent releasability can be accomplished by using the higher glass transition point resin, whereas excellent dyeability and light fastness can be accomplished by using the lower glass transition point resin. More specifically, when using the lower glass transition point resin, the dye is uniformly diffused in the receptor layer, so that the resulting thermal transfer image-receiving sheet is improved in dyeability and light fastness, exhibits a good film-forming property and is enhanced in releasability. In addition, when the resin (A) having a rigid skeleton is used as the higher glass transition point resin, the resulting thermal transfer image-receiving sheet can exhibit not only a good releasability but also a high dyeability which is considered to be derived from the rigid skeleton, although it has a high glass transition point. Further, even when the resin (A) is used as the lower glass transition point resin, there can be attained such an advantage that the resulting thermal transfer image-receiving sheet exhibits good dyeability and light fastness.

In the present invention, from the viewpoint of achieving both a good dyeability and a good releasability of the thermal transfer image-receiving sheet, the resin (A) is preferably used as the higher glass transition point resin among the two kinds of resins that are different in glass transition point from each other.

Further, when using the above specific intermediate layer together with the dye receptor layer, it is considered that the heat conductivity of the resulting thermal transfer image-receiving sheet can be optimized, so that the dyeability of the thermal transfer image-receiving sheet with dyes can also be enhanced.

(Substrate)

Examples of the substrate include synthetic papers (such as polyolefin-based papers and polystyrene-based papers), wood-free papers, art papers, coated papers, cast coated papers, wall papers, backing papers, synthetic resin- or emulsion-impregnated papers, cellulose fiber papers, and films or sheets made of various resins such as polyolefins, polyvinyl chloride, polyethylene terephthalate, polystyrene, polymethacrylate and polycarbonates. Further, as the substrate, there may also be used white opaque films produced by shaping a mixture of these resins with a white pigment or a filler into a film, or foamed sheets, as well as laminates composed of combination of these substrates.

The thickness of these substrates is generally, for example, from about 10 to about 300 μm. The substrates are preferably subjected to surface treatments such as primer treatment and corona discharge treatment from the viewpoint of enhancing an adhesion thereof to the dye receptor layer.

<Process for Producing Thermal Transfer Image-Receiving Sheet>

The thermal transfer image-receiving sheet of the present invention is preferably produced by the process including the step of forming the dye receptor layer on the substrate by using a coating solution containing the resin (A).

In addition, the thermal transfer image-receiving sheet of the present invention is preferably produced by the process including the steps of (1) forming the intermediate layer containing the water-soluble polymer and the hollow particles on the substrate; and (2) forming the dye receptor layer on the intermediate layer by using a coating solution containing the resin (A) and the resin (B).

The details of the substrate, the resin (A), the resin (B), the dye receptor layer and the intermediate layer as well as methods for obtaining the respective components, are the same as described previously.

<Thermal Transfer Method>

The present invention relates to a thermal transfer method in which a dye receptor layer containing the resin (A) is formed on a substrate to obtain a thermal transfer image-receiving sheet; and a transfer sheet containing a sublimable dye is brought into pressure contact with a surface of the dye receptor layer of the thermal transfer image-receiving sheet under heating to transfer the dye to the surface and obtain a transferred image thereon.

Also, the present invention relates to a thermal transfer method in which an intermediate layer containing a water-soluble polymer and hollow particles and a dye receptor layer containing the resin (A) and the resin (B) are successively formed on a substrate in this order to obtain a thermal transfer image-receiving sheet; and a transfer sheet containing a sublimable dye is brought into pressure contact with a surface of the dye receptor layer of the thermal transfer image-receiving sheet under heating to transfer the dye to the surface and obtain a transferred image thereon.

The details of the thermal transfer image-receiving sheet are the same as described previously.

Thus, in accordance with the present invention, the dye receptor layer, or both the intermediate layer and the dye receptor layer are formed on the substrate to obtain the thermal transfer image-receiving sheet, and the transfer sheet containing a sublimable dye is brought into pressure contact with a surface of the dye receptor layer of the thermal transfer image-receiving sheet under heating to transfer the dye to the surface and obtain a transferred image thereon.

The transfer sheet used upon conducting a thermal transfer procedure using the above thermal transfer image-receiving sheet of the present invention is usually in the form of a laminated sheet obtained by laminating a dye layer containing a sublimable dye, a protective layer to be transferred on a transferred image of the dye received on the image-receiving sheet, etc. on a paper or a polyester film. In the present invention, there may be used any of conventionally known transfer sheets.

Examples of the sublimable dye suitably used for the thermal transfer image-receiving sheet of the present invention include yellow dyes such as pyridone-azo-based dyes, dicyano-styryl-based dyes, quinophthalone-based dyes and merocyanine-based dyes; magenta dyes such as benzene-azo-based dyes, pyrazolone-azomethine-based dyes, isothiazole-based dyes and pyrazolo-triazole-based dyes; and cyan dyes such as anthraquinone-based dyes, cyano-methylene-based dyes, indophenol-based dyes and indonaphthol-based dyes.

As the method for applying a heat energy upon the thermal transfer, there may be used any of conventionally known methods, for example, the method of applying a heat energy of from about 5 to about 100 $mJ/mm^2$ by controlling a recording time using a recording apparatus such as a thermal printer.

In accordance with the present invention, there can be provided a thermal transfer image-receiving sheet which is excellent in both of dyeability with dyes and releasability of the sheet, and a process for producing the thermal transfer image-receiving sheet.

In accordance with the present invention, there can also be provided a thermal transfer image-receiving sheet which is excellent in all of dyeability with dyes, releasability and light fastness, and a process for producing the thermal transfer image-receiving sheet.

The thermal transfer image-receiving sheet of the present invention is excellent in both of dyeability of the sheet with dyes, releasability of the sheet, etc., and, therefore, can be suitably used as a thermal transfer image-receiving sheet capable of exhibiting an excellent image performance.

The present invention is described in more detail by referring to the following examples, etc. However, it should be noted that these examples, etc., are only illustrative and not intended to limit the invention thereto.

Various properties were measured and evaluated by the following methods.

[Acid Value of Resin]

The acid value of a resin was measured according to JIS K0070. However, with respect to the solvent used in the measurement, the mixed solvent of ethanol and ether was replaced with a mixed solvent containing acetone and toluene at a volume ratio of 1:1.

[Softening Point and Glass Transition Point of Resin]

(1) Softening Point

Using a flow tester "CFT-500D" available from Shimadzu Corporation, 1 g of a sample was extruded through a nozzle having a die pore diameter of 1 mm and a length of 1 mm while heating at a temperature rise rate of 6° C./min and applying a load of 1.96 MPa thereto by a plunger. The softening point was determined as the temperature at which a half the amount of the sample was flowed out when plotting a downward movement of the plunger of the flow tester relative to the temperature.

(2) Glass Transition Point

Using a differential scanning calorimeter ("Pyris 6DSC" available from Perkin Elmer, Inc.), a sample was heated to 200° C. and then cooled from 200° C. to 0° C. at a temperature drop rate of 10° C./min, and thereafter heated again at temperature rise rate of 10° C./min. The temperature at which an extension of a baseline below a maximum peak temperature observed in the endothermic curve was intersected with a tangential line having a maximum inclination of the curve in a region of from a rise-up portion of the peak to an apex of the peak was read as the glass transition point.

[Glass Transition Point of Resin in Resin Dispersion]

When measuring the glass transition point of resin particles in the resin dispersion, the resin dispersion was freeze-dried to remove a solvent therefrom, and the thus obtained solid was subjected to measurement of its glass transition point.

Upon freeze-drying the resin dispersion, 30 g of the resin dispersion was subjected to vacuum drying at −25° C. for 1 h, at −10° C. for 10 h and then at 25° C. for 4 h until the water content reached 1% by weight or less, using freeze dryers "FDU-2100" and "DRC-1000" both available from Tokyo Rika Kikai Co., Ltd. The water content was measured as follows. Using an infrared moisture meter ("FD-230" available from Kett Electronic Laboratory), 5 g of a dried sample was dried at 150° C. to measure a water content thereof under a measuring mode 96 (monitoring time: 2.5 min; variation width: 0.05%).

[Number-Average Molecular Weight of Resin]

The number-average molecular weight was calculated from the molecular weight distribution measured by gel permeation chromatography according to the following method.

(1) Preparation of Sample Solution

The resin was dissolved in chloroform to prepare a solution having a concentration of 0.5 g/100 mL. The resultant solution was then filtered through a fluororesin filter ("FP-200" available from Sumitomo Electric Industries, Co., Ltd.) having a pore size of 2 μm to remove insoluble components therefrom, thereby preparing a sample solution.

(2) Measurement of Molecular Weight

Tetrahydrofuran as a dissolvent was allowed to flow at a rate of 1 mL/min, and the column was stabilized in a thermostat at 40° C. One-hundred microliters of the sample solution was injected into the column to measure a molecular weight distribution thereof. The molecular weight of the sample was calculated on the basis of a calibration curve previously prepared. The calibration curve of the molecular weight was prepared by using several kinds of monodisperse polystyrenes (those polystyrenes having molecular weights of $2.63\times10^3$, $2.06\times10^4$ and $1.02\times10^5$ available from Toso Company Ltd.; and those polystyrenes having molecular weights of $2.10\times10^3$, $7.00\times10^3$ and $5.04\times10^4$ available from GL Science Inc.) as standard samples.

Analyzer: CO-8010 (available from Toso Company Ltd.)

Column: GMHLX+G3000HXL (available from Toso Company Ltd.)

[Particle Size of Resin Particles in Resin Dispersion]

The particle size of resin particles was measured using a laser diffraction particle size analyzer ("LA-920" available from HORIBA Ltd.). That is, a cell for the measurement was filled with distilled water, and a volume median particle size ($D_{50}$) of the resin particles was measured at a concentration at which an absorbance thereof was within an adequate range.

[Solid Concentration of Resin Dispersion]

Using an infrared moisture meter ("FD-230" available from Kett Electronic Laboratory), 5 g of the dispersion was dried at 150° C., and the water content (%) of the sample on a wet base was measured under a measuring mode 96 (monitoring time: 2.5 min; variation width: 0.05%). The solid concentration of each dispersion was calculated according to the following formula.

$$\text{Solid Concentration}(\%)=100-M$$

wherein M is a water content (%) on a wet base represented by the following formula:

$$\text{Water Content}(\%)\text{on Wet Base}=[(W-W_0)/W]\times100$$

wherein W is a weight of the sample before measurement (initial weight of the sample); and $W_0$ is a weight of the sample after measurement (absolute dry weight of the sample).

[Jelly Strength of Gelatin]

Measured according to JIS K6503.

[Isoionic Point of Gelatin]

Using a pH meter, a hydrogen ion concentration of a sample liquid desalted by an ion exchange resin was measured. More specifically, the measurement was carried out as follows.

Reagent: (1) Strong acid cation exchange resin (H type) ("AMBERLITE IR-120B" available from Rohm & Haas Co.)

(2) Strong base anion exchange resin (I type) ("AMBERLITE IRA-401" available from Rohm & Haas Co.)

Apparatus: pH meter ("HM-20P" available from Toa DKK-TOA Corporation)

Sample Liquid: 1% Solution of gelatin sample

Measurement: (1) Mixing 5 mL of a strong cation exchange resin with 10 mL of a strong base anion exchange resin; (2) washing the resulting mixed resin with pure water twice and adding pure water to the resin, followed by preserving the resin at a temperature of 35° C.; (3) removing water from the thus preserved resin and then adding 100 mL of a sample liquid thereto, followed by stirring the mixture at a temperature of 35° C. for 20 min or longer; (4) removing the ion exchange resins from the sample liquid by a decantation method; and (5) raising the temperature of the sample liquid to 35° C. at which a pH of the liquid was rapidly measured and determined as an isoionic point thereof.

[Viscosity of Water-Soluble Polymer]

Measured at 60° C. according to JIS K6503-2001.

Resin Production Example 1

Production of Resin (a)

The raw monomers of a polyester except for trimellitic anhydride as shown in Table 1 were charged into a 10 L four-necked flask equipped with a thermometer, a stainless steel stirring bar, a falling type condenser and a nitrogen inlet tube. While stirring the contents of the flask in a mantle heater in a nitrogen atmosphere at 160° C., a mixture of the raw monomer of the addition polymer-based resin, the dually reactive monomer and the polymerization initiator as shown in Table 1 was added dropwise thereto through a dropping funnel at a rate of 72 mL/min over 1 h. The resulting reaction mixture was aged for 1 h while maintaining the mixture at a temperature of 160° C., and then heated to 200° C. and held under a pressure of 8.0 kPa for 1 h to remove the vinyl-based resin monomer therefrom. Thereafter, the esterification catalyst as shown in Table 1 was added to the reaction solution, and the obtained mixture was reacted at 230° C. under normal pressure (101.3 kPa) for 6 h and then under a pressure of 8.0 kPa for 1 h. The obtained reaction solution was cooled to 200° C., and mixed and reacted with trimellitic anhydride as shown in Table 1. While tracing a softening point of the reaction product according to ASTM D36-86, the reaction was continued until the softening point reached a desired value, thereby obtaining a resin (a).

Resin Production Example 2

Production of Resin (b)

The raw monomers of a polyester except for trimellitic anhydride as shown in Table 1 were charged into a 10 L four-necked flask equipped with a thermometer, a stainless steel stirring bar, a falling type condenser and a nitrogen inlet tube. While stirring the contents of the flask in a mantle heater in a nitrogen atmosphere at 160° C., a mixture of the raw monomer of the addition polymer-based resin, the dually reactive monomer and the polymerization initiator as shown in Table 1 was added dropwise thereto through a dropping funnel at a rate of 72 mL/min over 1 h. The resulting reaction mixture was aged for 1 h while maintaining the mixture at a temperature of 160° C., and then heated to 200° C. and held under a pressure of 8.0 kPa for 1 h to remove the remaining raw monomer of the addition polymer-based resin therefrom. Thereafter, the esterification catalyst as shown in Table 1 was added to the reaction solution, and the obtained mixture was reacted at 180° C. under normal pressure (101.3 kPa) for 6 h, at 200° C. under normal pressure for 2 h and then under a pressure of 8.0 kPa for 1 h. The obtained reaction solution was mixed and reacted with trimellitic anhydride as shown in Table 1. While tracing a softening point of the reaction product according to ASTM D36-86, the reaction was continued until the softening point reached a desired value, thereby obtaining a resin (b).

Resin Production Example 3

Production of Resin (c)

The raw monomers of a polyester as shown in Table 1 were charged into a 10 L four-necked flask equipped with a thermometer, a stainless steel stirring bar, a falling type condenser and a nitrogen inlet tube. While stirring the contents of the flask in a mantle heater in a nitrogen atmosphere at 160° C., a mixture of the raw monomer of the addition polymer-based resin, the dually reactive monomer and the polymerization initiator as shown in Table 1 was added dropwise thereto through a dropping funnel at a rate of 70 mL/min over 1 h. The resulting reaction mixture was aged for 1 h while maintaining the mixture at a temperature of 160° C., and then heated to 200° C. and held under a pressure of 8.0 kPa for 1 h to remove the remaining raw monomer of the addition polymer-based resin therefrom. Thereafter, the esterification catalyst as shown in Table 1 was added to the reaction solution, and the obtained mixture was reacted at 230° C. under normal pressure (101.3 kPa) for 6 h, and cooled to 210° C. While tracing a softening point of the reaction product according to ASTM D36-86, the reaction was continued under a pressure of 8.0 kPa until the softening point reached a desired value, thereby obtaining a resin (c).

Resin Production Example 4

Production of Resin (d)

The raw monomers of a polyester as shown in Table 1 were charged into a 10 L four-necked flask equipped with a thermometer, a stainless steel stirring bar, a falling type condenser and a nitrogen inlet tube. While stirring the contents of the flask in a mantle heater in a nitrogen atmosphere at 160° C., a mixture of the raw monomer of the addition polymer-based resin, the dually reactive monomer and the polymerization initiator as shown in Table 1 was added dropwise thereto through a dropping funnel at a rate of 68 mL/min over 1 h. The resulting reaction mixture was aged for 1 h while maintaining the mixture at a temperature of 160° C., and then heated to 200° C. and held under a pressure of 8.0 kPa for 1 h to remove the remaining raw monomer of the addition polymer-based resin therefrom. Thereafter, the esterification catalyst as shown in Table 1 was added to the reaction solution, and the obtained mixture was reacted at 180° C. under normal pressure for 6 h and then at 200° C. under normal pressure (101.3 kPa) for 2 h. While tracing a softening point of the reaction product according to ASTM D36-86, the reaction was continued under a pressure of 8.0 kPa until the softening point reached a desired value, thereby obtaining a resin (d).

Resin Production Example 5

Production of Resin (e)

The raw monomers of a polyester except for trimellitic anhydride as shown in Table 1 were charged into a 10 L four-necked flask equipped with a thermometer, a stainless steel stirring bar, a falling type condenser and a nitrogen inlet tube. While stirring the contents of the flask in a mantle heater in a nitrogen atmosphere at 160° C., a mixture of the raw monomer of the addition polymer-based resin, the dually reactive monomer and the polymerization initiator as shown in Table 1 was added dropwise thereto through a dropping funnel at a rate of 50 mL/min over 1 h. The resulting reaction mixture was aged for 1 h while maintaining the mixture at a temperature of 160° C., and then heated to 200° C. and held under a pressure of 8.0 kPa for 1 h to remove the remaining raw monomer of the addition polymer-based resin therefrom. Thereafter, the esterification catalyst as shown in Table 1 was added to the reaction solution, and the obtained mixture was reacted at 230° C. under normal pressure (101.3 kPa) for 7 h and then under a pressure of 8.0 kPa for 1 h. The obtained reaction solution was cooled to 200° C., and mixed and reacted with trimellitic anhydride as shown in Table 1. While tracing a softening point of the reaction product according to ASTM D36-86, the reaction was continued until the softening point reached a desired value, thereby obtaining a resin (e).

Resin Production Example 6

Production of Resin (f)

The raw monomers of a polyester except for trimellitic anhydride as shown in Table 1 were charged into a 10 L four-necked flask equipped with a thermometer, a stainless steel stirring bar, a falling type condenser and a nitrogen inlet tube. While stirring the contents of the flask in a mantle heater in a nitrogen atmosphere at 160° C., a mixture of the raw monomer of the addition polymer-based resin, the dually reactive monomer and the polymerization initiator as shown in Table 1 was added dropwise thereto through a dropping funnel at a rate of 72 mL/min over 1 h. The resulting reaction mixture was aged for 1 h while maintaining the mixture at a temperature of 160° C., and then heated to 200° C. and held under a pressure of 8.0 kPa for 1 h to remove the remaining raw monomer of the addition polymer-based resin therefrom. Thereafter, the esterification catalyst as shown in Table 1 was added to the reaction solution, and the obtained mixture was reacted at 230° C. under normal pressure (101.3 kPa) for 6 h and then under a pressure of 8.0 kPa for 1 h. The obtained reaction solution was cooled to 200° C., and mixed and reacted with trimellitic anhydride as shown in Table 1. While tracing a softening point of the reaction product according to ASTM D36-86, the reaction was continued until the softening point reached a desired value, thereby obtaining a resin (f).

Comparative Resin Production Example 1

Production of Resin (g)

The raw monomers of a polyester except for trimellitic anhydride and the esterification catalyst as shown in Table 1 were charged into a 10 L four-necked flask equipped with a thermometer, a stainless steel stirring bar, a falling type condenser and a nitrogen inlet tube. The contents of the flask were reacted at 230° C. under normal pressure for 6 h and then under a pressure of 8.0 kPa for 1 h. The obtained reaction solution was cooled to 200° C., and mixed and reacted with trimellitic anhydride as shown in Table 1. While tracing a softening point of the reaction product according to ASTM D36-86, the reaction was continued until the softening point reached a desired value, thereby obtaining a resin (g).

Comparative Resin Production Example 2

Production of Resin (h)

The raw monomers of a polyester except for trimellitic anhydride and the esterification catalyst as shown in Table 1 were charged into a 10 L four-necked flask equipped with a thermometer, a stainless steel stirring bar, a falling type condenser and a nitrogen inlet tube. The contents of the flask were reacted at 180° C. under normal pressure for 6 h, at 200° C. under normal pressure (101.3 kPa) for 2 h and then under a pressure of 8.0 kPa for 1 h. The obtained reaction solution was mixed and reacted with trimellitic anhydride as shown in Table 1. While tracing a softening point of the reaction product according to ASTM D36-86, the reaction was continued until the softening point reached a desired value, thereby obtaining a resin (h).

The monomer compositions used in the respective Resin Production Examples and Comparative Resin Production Examples as well as properties of the resulting resins are collectively shown in Table 1.

TABLE 1

| | Resin Production Examples | | | |
|---|---|---|---|---|
| | 1 | 2 | 3 | 4 |
| Resin (A), etc. | (a) | (b) | (c) | (d) |
| (a) Raw monomers of polyester (g) | | | | |
| Alcohol component | | | | |
| BPA-PO*[1] | 4200 | 4200 | 3912 | 3850 |
| BPA-PO (mol %) | 100 | 100 | 100 | 100 |
| PO adduct content (mol %) | 100 | 100 | 100 | 100 |
| Carboxylic acid component | | | | |
| (Dicarboxylic acid) | | | | |
| Isophthalic acid | 1195 | — | 1793 | — |
| 1,4-Cyclohexanedicarboxylic acid | — | 1238 | — | 1703 |
| Aromatic dicarboxylic acid content (mol %) | 100 | 0 | 100 | 0 |
| (Trivalent or higher-valent carboxylic acid) | | | | |
| Trimellitic anhydride | 461 | 461 | — | — |
| Esterification catalyst (g) | | | | |
| Tin (II) dioctylate | — | 30 | — | 30 |
| Dibutyl tin oxide | 20 | — | 20 | — |
| (b) Raw monomer of addition polymer-based resin (g) | | | | |
| Styrene | 3527 | 3554 | 3425 | 3343 |
| 2-Ethylhexyl acrylate | — | — | — | — |
| Polymerization initiator (g) | | | | |
| Dibutyl peroxide | 212 | 213 | 206 | 201 |
| (c) Dually reactive monomer (g) | | | | |
| Acrylic acid | 130 | 130 | 173 | 158 |
| (a)/[(b) + (c)] (wt %) | 62/38 | 62/38 | 61/39 | 61/39 |
| Acid value (mg KOH/g) | 23 | 25 | 27 | 18 |
| Softening point (° C.) | 128 | 131 | 125 | 124 |
| Glass transition point (° C.) | 60 | 57 | 67 | 59 |

| | Resin Production Examples | | Comparative Resin Production Examples | |
|---|---|---|---|---|
| | 5 | 6 | 1 | 2 |
| Resin (A), etc. | (e) | (f) | (g) | (h) |
| (a) Raw monomers of polyester (g) | | | | |
| Alcohol component | | | | |
| BPA-PO*[1] | 4550 | 4200 | 3500 | 7000 |
| BPA-PO (mol %) | 100 | 100 | 100 | 100 |
| PO adduct content (mol %) | 100 | 100 | 100 | 100 |
| Carboxylic acid component | | | | |
| (Dicarboxylic acid) | | | | |
| Isophthalic acid | 1316 | 1195 | 1245 | — |
| 1,4-Cyclohexanedicarboxylic acid | — | — | — | 3268 |
| Aromatic dicarboxylic acid content (mol %) | 100 | 100 | 100 | 0 |
| (Trivalent or higher-valent carboxylic acid) | | | | |
| Trimellitic anhydride | 499 | 461 | 307 | 384 |
| Esterification catalyst (g) | | | | |
| Tin (II) dioctylate | — | — | 23 | 53 |
| Dibutyl tin oxide | 20 | 20 | — | — |

TABLE 1-continued

| | | | | |
|---|---|---|---|---|
| (b) Raw monomer of addition polymer-based resin (g) | | | | |
| Styrene | 2455 | 2893 | — | — |
| 2-Ethylhexyl acrylate | — | 635 | — | — |
| Polymerization initiator (g) | | | | |
| Dibutyl peroxide | 147 | 212 | — | — |
| (c) Dually reactive monomer (g) | | | | |
| Acrylic acid | 112 | 130 | — | — |
| (a)/[(b) + (c)] (wt %) | 71/29 | 62/38 | 100/0 | 100/0 |
| Acid value (mg KOH/g) | 23 | 23 | 23 | 20 |
| Softening point (° C.) | 130 | 128 | 122 | 120 |
| Glass transition point (° C.) | 69 | 60 | 71 | 64 |

Note

*[1]Polyoxypropylene (2.2)-2,2-bis(4-hydroxyphenyl)propane (compound of the formula (I) wherein $R^1$ = oxypropylene; $R^2$ = oxypropylene; x = 2; y = 2)

Resin Dispersion Production Examples 1 to 6 and Comparative Resin Dispersion Production Examples 1 and 2

Production of Resin Dispersions (A1) to (H1)

A four-necked flask equipped with a nitrogen inlet tube, a reflux condenser, a stirrer and a thermocouple was charged with the respective resins (a) to (h) with the formulations as shown in Table 2, and the contents of the flask were dissolved in methyl ethyl ketone. Next, a 25% ammonia aqueous solution was added to the resulting solution, and then deionized water was added thereto while stirring. The resulting mixture was placed under reduced pressure at 50° C. to remove methyl ethyl ketone therefrom, thereby obtaining resin dispersions (A1) to (H1). The compositions, volume-median particle sizes of resin particles, solid contents and pH values of the resulting resin dispersions (A1) to (H1) are shown in Table 2.

TABLE 2

| | Resin Dispersion Production Examples | | | |
|---|---|---|---|---|
| | 1 | 2 | 3 | 4 |
| Resin dispersion | A1 | B1 | C1 | D1 |
| Resin | | | | |
| Resin | a | b | c | d |
| Amount (g) | 300 | 300 | 300 | 300 |
| Aromatic dicarboxylic acid content (mol %) | 100 | 0 | 100 | 0 |
| (a)/[(b) + (c)] (wt %) | 62/38 | 62/38 | 61/39 | 61/39 |
| Methyl ethyl ketone (g) | 540 | 540 | 540 | 540 |
| 25% Ammonia aqueous solution (g) | 7.6 | 7.9 | 7.4 | 6.4 |
| Deionized water (g) | 710 | 710 | 710 | 710 |
| Particle size (nm) | 143 | 98 | 93 | 145 |
| Solid content (wt %) | 37.6 | 33.6 | 38.4 | 33.8 |
| pH | 7.2 | 7.8 | 7.1 | 8.0 |

| | Resin Dispersion Production Examples | | Comparative Resin Dispersion Production Examples | |
|---|---|---|---|---|
| | 5 | 6 | 1 | 2 |
| Resin dispersion | E1 | F1 | G1 | H1 |
| Resin | | | | |
| Resin | e | f | g | h |
| Amount (g) | 300 | 300 | 300 | 300 |
| Aromatic dicarboxylic acid | 100 | 100 | 100 | 0 |

TABLE 2-continued

| | | | | |
|---|---|---|---|---|
| content (mol %) | | | | |
| (a)/[(b) + (c)] (wt %) | 71/29 | 62/38 | 100/0 | 100/0 |
| Methyl ethyl ketone (g) | 540 | 540 | 540 | 540 |
| 25% Ammonia aqueous solution (g) | 6.8 | 7.5 | 5.6 | 5.9 |
| Deionized water (g) | 710 | 710 | 710 | 710 |
| Particle size (nm) | 93 | 190 | 200 | 166 |
| Solid content (wt %) | 38.3 | 36.1 | 38.8 | 38.1 |
| pH | 7.0 | 7.3 | 7.1 | 7.1 |

Resin Dispersion Production Examples 7 to 12 and Comparative Resin Dispersion Production Examples 3 and 4

Production of Resin Dispersions (A2) to (H2)

A four-necked flask equipped with a nitrogen inlet tube, a reflux condenser, a stirrer and a thermocouple was charged with the respective resin dispersions (A1) to (H1) and a water-soluble oxazoline-containing polymer with the formulations as shown in Table 3, and the contents of the flask were reacted at 95° C. for 4 h under stirring, thereby obtaining resin dispersions (A2) to (H2). The compositions, volume-median particle sizes of dispersed particles, solid contents and pH values of the resulting resin dispersions (A2) to (H2) are shown in Table 3.

TABLE 3

| | Resin Dispersion Production Examples | | | |
|---|---|---|---|---|
| | 7 | 8 | 9 | 10 |
| Resin dispersion | A2 | B2 | C2 | D2 |
| Resin dispersion | | | | |
| Resin dispersion | A1 | B1 | C1 | D1 |
| Amount (g) | 700 | 700 | 700 | 700 |
| Resin (A), etc. | | | | |
| Resin | a | b | c | d |
| Aromatic dicarboxylic acid content (mol %) | 100 | 0 | 100 | 0 |
| (a)/[(b) + (c)] (wt %) | 62/38 | 62/38 | 61/39 | 61/39 |
| Oxazoline compound*2 (g) | 95 | 86 | 113 | 65 |
| Deionized water (g) | 26 | 0 | 36 | 0 |
| Particle size (nm) | 139 | 98 | 91 | 142 |
| Solid content (wt %) | 34.7 | 32.8 | 35.1 | 37.7 |
| pH | 9.2 | 9.3 | 9.2 | 9.1 |

| | Resin Dispersion Production Examples | | Comparative Resin Dispersion Production Examples | |
|---|---|---|---|---|
| | 11 | 12 | 3 | 4 |
| Resin dispersion | E2 | F2 | G2 | H2 |
| Resin dispersion | | | | |
| Resin dispersion | E1 | F1 | G1 | H1 |
| Amount (g) | 700 | 700 | 700 | 700 |
| UZ,1/7 Resin (A), etc. | | | | |
| Resin | e | f | g | h |
| Aromatic dicarboxylic acid content (mol %) | 100 | 100 | 100 | 0 |
| (a)/[(b) + (c)] (wt %) | 71/29 | 62/38 | 100/0 | 100/0 |
| Oxazoline compound*2 (g) | 98 | 84 | 89 | 80 |
| Deionized water (g) | 38 | 0 | 11 | 39 |

TABLE 3-continued

| | | | | |
|---|---|---|---|---|
| Particle size (nm) | 92 | 260 | 195 | 210 |
| Solid content (wt %) | 35.6 | 32.5 | 36.0 | 35.1 |
| pH | 9.1 | 9.2 | 9.0 | 9.1 |

Note
*2"EPOCROSS WS-700" (g)

Production of Polystyrene Dispersion

A four-necked flask equipped with a nitrogen inlet tube, a reflux condenser, a dropping funnel, a stirrer and a thermocouple was charged with 100 g of water, 0.7 g of sodium dodecylbenzenesulfonate and 0.08 g of sodium persulfate, and the contends of the flask were stirred under a nitrogen flow and heated to 80° C. Separately, a glass beaker was charged with 100 g of styrene, 86 g of water, 6.0 g of sodium dodecylbenzenesulfonate and 0.3 g of sodium persulfate, and the contents of the beaker were stirred and dissolved and treated by a homomixer for 10 min, thereby preparing an emulsified product. The thus prepared emulsified product was charged into the dropping funnel, and added dropwise into the four-necked flask at a constant rate over 3 h. After completion of the dropping, the resulting reaction mixture was aged for 2 h. After cooled to room temperature, the reaction mixture was filtered through a 200-mesh wire screen to obtain a polystyrene dispersion. As a result, it was confirmed that the volume-median particle size of particles dispersed in the thus obtained polystyrene dispersion was 114 nm, and the solid content of the dispersion was 33.4%.

Examples 1 to 6 and Comparative Examples 1 to 4

Production of Thermal Transfer Image-Receiving Sheets

The respective components as shown in Table 4 were mixed with each other at 25° C. with the formulations as shown in Table 4 to prepare coating solutions (A3) to (J3). The thus prepared coating solutions were respectively applied onto a synthetic paper "YUPO FGS-250" (thickness: 250 μm; basis weight: 200 g/m$^2$) using a wire bar such that a coating amount thereof after dried was 5.0 g/m$^2$, and then dried at 50° C. for 2 min, thereby obtaining thermal transfer image-receiving sheets. Next, a gradation pattern of respective colors including black (K), yellow (Y), magenta (M), cyan (C), green (G), red (R) and blue (B) was printed onto the thus obtained thermal transfer image-receiving sheet using a commercially available sublimation-type printer ("SELPHY" available from Canon Corp.). The thus printed gradation patterns were respectively evaluated for a dyeability (maximum density) by the following method. In addition, a black solid image having a size of 5×5 cm was continuously printed on the three sheets to evaluate a releasability (heat fusibility) of the respective thermal transfer image-receiving sheets from an ink ribbon upon printing. The above properties were respectively measured and evaluated by the following methods. The results are shown in Table 4.

Evaluation Methods (Dyeability: Maximum Density)

The density of a printed image thermally transferred in a high-density black printing (18th Gradation) was measured using a Gretag densitometer.

(Releasability: Heat Fusibility)

The heat fusibility between the ink ribbon and the thermal transfer image-receiving sheet upon printing a black solid image was determined from a sound generated when the ink ribbon was peeled from the thermal transfer image-receiving sheet, according to the following ratings.

A: Peelable without any strange sound during continuous printing of three sheets.

B: Peelable with slight strange sound during continuous printing of three sheets.

C: Continuous printing of three sheets was difficult.

TABLE 4

| | Examples | | | | |
|---|---|---|---|---|---|
| | 1 | 2 | 3 | 4 | 5 |
| Coating solution | A3 | B3 | C3 | D3 | E3 |
| Dye receptor layer coating solution | | | | | |
| Resin dispersion | | | | | |
| Resin dispersion | A2 | B2 | C2 | D2 | E2 |
| Amount (g) | 10 | 10 | 10 | 10 | 10 |
| Resin (A), etc. | | | | | |
| Resin | a | b | c | d | e |
| Aromatic dicarboxylic acid content (mol %) | 100 | 0 | 100 | 0 | 100 |
| (a)/[(b) + (c)] (wt %) | 62/38 | 62/38 | 61/39 | 61/39 | 71/29 |
| Kind of resin | Resin (A) | Resin (A) | Resin (A) | Resin (A) | Resin (A) |
| Film-forming agent (g) | | | | | |
| Butyl carbitol acetate | 0.48 | 0.48 | 0.48 | 0.48 | 0.48 |
| Releasing agent (g) | | | | | |
| KF615A*3 | 0.15 | 0.15 | 0.15 | 0.15 | 0.15 |
| Evaluation | | | | | |
| Dyeability (maximum density) | 1.64 | 1.63 | 1.62 | 1.61 | 1.64 |
| Releasability (black solid image printing) | A | A | A | A | A |

| | | Comparative Examples | | | |
|---|---|---|---|---|---|
| | Example 6 | 1 | 2 | 3 | 4 |
| Coating solution | F3 | G3 | H3 | I3 | J3 |
| Dye receptor layer coating solution | | | | | |
| Resin dispersion | | | | | |
| Resin dispersion | F2 | G2 | H2 | *(1) | *(2) |
| Amount (g) | 10 | 10 | 10 | 10 | 10 |
| Resin (A), etc. | | | | | |
| Resin | f | g | h | | |
| Aromatic dicarboxylic acid content (mol %) | 100 | 100 | 0 | — | — |
| (a)/[(b) + (c)] (wt %) | 62/38 | 100/0 | 100/0 | — | — |
| Kind of resin | Resin (A) | *(3) | *(3) | *(4) | *(5) |
| Film-forming agent (g) | | | | | |
| Butyl carbitol acetate | 0.48 | 0.48 | 0.48 | 0.48 | 0.48 |
| Releasing agent (g) | | | | | |
| KF615A*3 | 0.15 | 0.15 | 0.15 | 0.15 | 0.15 |
| Evaluation | | | | | |
| Dyeability (maximum density) | 1.62 | 1.67 | — | 1.13 | 1.34 |
| Releasability (black solid image printing) | A | C | C | A | A |

Note

*Solid concentration of dispersion was adjusted to 30% by weight

*3KF615A (polyether-modified silicone; available from Shin-Etsu Chemical, Co., Ltd.)

*(1): Polystyrene dispersion

*(2): G2/polystyrene dispersion = 6/4

*(3): No addition polymer-based resin

TABLE 4-continued

*(4): No polyester

*(5): Not subjected to addition polymerization and polycondensation

Resin Production Example 7

Production of Resin (q)

The raw monomers of a polyester except for trimellitic anhydride as shown in Table 5 were charged into a 10 L four-necked flask equipped with a thermometer, a stainless steel stirring bar, a falling type condenser and a nitrogen inlet tube. While stirring the contents of the flask in a mantle heater in a nitrogen atmosphere at 160° C., a mixture of the raw monomer of the addition polymer-based resin, the dually reactive monomer and the polymerization initiator as shown in Table 5 was added dropwise thereto through a dropping funnel at a rate of 72 mL/min over 1 h. The resulting reaction mixture was aged for 1 h while maintaining the mixture at a temperature of 160° C., and then heated to 200° C. and held under a pressure of 8.0 kPa for 1 h to remove the vinyl-based resin monomer therefrom. Thereafter, the esterification catalyst as shown in Table 5 was added to the reaction solution, and the obtained mixture was reacted at 230° C. under normal pressure (101.3 kPa) for 6 h and then under a pressure of 8.0 kPa for 1 h. The obtained reaction solution was cooled to 200° C., and mixed and reacted with trimellitic anhydride as shown in Table 5. While tracing a softening point of the reaction product according to ASTM D36-86, the reaction was continued until the softening point reached a desired value, thereby obtaining a resin (q).

Resin Production Example 8

Production of Resin (r)

The same procedure as in Resin Production Example 4 was repeated to obtain a resin (r) as shown in Table 5.

Resin Production Example 9

Production of Resin (s)

The raw monomers of a polyester and the catalyst as shown in Table 5 were charged into a four-necked flask equipped with a nitrogen inlet tube, a dehydration tube, a stirrer and a thermocouple, and the contents of the flask were, in a nitrogen atmosphere, reacted at 190° C. for 10 h and further reacted under reduced pressure (20 kPa) for 1 h, thereby obtaining a resin (s).

The results of measurements for acid value, softening point, glass transition point and number-average molecular weight of each of the thus obtained resins (q) to (s) are shown in Table 5.

TABLE 5

| | Resin Production Examples | | |
|---|---|---|---|
| | 1 | 2 | 3 |
| Resin (A), etc. | q | r | s |
| (a) Raw monomers of polyester (g) | | | |
| Alcohol component | | | |
| BPA-PO*1 | 4200 | 3850 | 3360 |

TABLE 5-continued

| | Resin Production Examples | | |
|---|---|---|---|
| | 1 | 2 | 3 |
| BPA-PO (mol %) | 100 | 100 | 100 |
| PO adduct content (mol %) | 100 | 100 | 100 |
| Carboxylic acid component | | | |
| (Dicarboxylic acid) | | | |
| Succinic acid | | | 1204 |
| 1,4-Cyclohexanedicarboxylic acid | 1032 | 1703 | |
| (Trivalent or higher-valent carboxylic acid) | | | |
| Trimellitic anhydride | 230 | | |
| Esterification catalyst (g) | | | |
| Tin (II) dioctylate | 30 | 30 | 23 |
| (b) Raw monomer of addition polymer-based resin (g) | | | |
| Styrene | 3436 | 3343 | |
| Polymerization initiator (g) | | | |
| Dibutyl peroxide | 206 | 201 | |
| (c) Dually reactive monomer (g) | | | |
| Acrylic acid | 346 | 158 | |
| (a)/[(b) + (c)] (wt %) | 59/41 | 61/39 | 100/0 |
| Acid value (mg KOH/g) | 27 | 18 | 21 |
| Softening point (° C.) | 127 | 124 | 77 |
| Glass transition point (° C.) | 54 | 59 | 38 |
| Number-average molecular weight | 2500 | 4800 | 5706 |

Note
*[1]Polyoxypropylene (2.2)-2,2-bis(4-hydroxyphenyl)propane (compound of the formula (I) wherein $R^1$ = oxypropylene; $R^2$ = oxypropylene; x = 2; y = 2)

Resin Dispersion Production Examples 13 to 15

Production of Resin Dispersions (Q1), (R1) and (S1)

A four-necked flask equipped with a nitrogen inlet tube, a reflux condenser, a stirrer and a thermocouple was charged with the resin with the formulations as shown in Table 6, and the contents of the flask were dissolved in methyl ethyl ketone. Next, a 25% ammonia aqueous solution was added to the resulting solution, and then deionized water was added thereto while stirring. The resulting mixture was placed under reduced pressure at 50° C. to remove methyl ethyl ketone therefrom, thereby obtaining resin dispersions (Q1), (R1) and (S1). The compositions, volume-median particle sizes of resin particles, solid contents and pH values of the resulting resin dispersions (Q1), (R1) and (S1) are shown in Table 6.

TABLE 6

| | Resin Dispersion Production Examples | | |
|---|---|---|---|
| | 13 | 14 | 15 |
| Resin dispersion | Q1 | R1 | S1 |
| Resin | | | |
| Resin | q | R | s |
| Amount (g) | 300 | 300 | 300 |
| (a)/[(b) + (c)] (wt %) | 59/41 | 61/39 | 100/0 |
| Glass transition point (° C.) | 54 | 59 | 38 |
| Methyl ethyl ketone (g) | 540 | 540 | 540 |
| 25% Ammonia aqueous solution (g) | 12.7 | 6.4 | 7.6 |
| Deionized water (g) | 710 | 710 | 700 |

TABLE 6-continued

| | Resin Dispersion Production Examples | | |
|---|---|---|---|
| | 13 | 14 | 15 |
| Volume-median particle size (nm) | 440 | 145 | 104 |
| Solid content (wt %) | 39.5 | 33.8 | 33.4 |
| Tg of resin in resin dispersion (° C.) | 54 | 59 | 38 |
| pH | 8.0 | 8.0 | 8.0 |

Resin Dispersion Production Examples 16 and 17

Production of Resin Dispersions (Q2) and (R2)

A four-necked flask equipped with a nitrogen inlet tube, a reflux condenser, a stirrer and a thermocouple was charged with the respective resin dispersions (Q1) and (R1) and a water-soluble oxazoline-containing polymer ("EPOCROSS WS-700" available from Nippon Shokubai Co., Ltd.; oxazoline group content in oxazoline-containing polymer: 4.55 mmol; number-average molecular weight: 20,000; 25% aqueous solution) with the formulation as shown in Table 7, and the contents of the flask were reacted with each other under stirring at 95° C. for 4 h, thereby obtaining respective resin particle dispersions (Q2) and (R2). The compositions of the thus obtained respective resin particle dispersions (Q2) and (R2), the volume-median particle sizes of the particles dispersed in the respective dispersions, and the solid contents and pH values of the respective dispersions are shown in Table 7.

Resin Dispersion Production Example 18

Production of Resin Dispersion (T1)

A four-necked flask equipped with a nitrogen inlet tube, a reflux condenser, a dropping funnel, a stirrer and a thermocouple was charged with 100 g of water, 1.3 g of sodium dodecylbenzenesulfonate and 0.09 g of sodium persulfate, and the contends to the flask were stirred under a nitrogen flow and heated to 80° C. Separately, a glass beaker was charged with 189 g of phenoxyethyl acrylate, 11 g of styrene, 86 g of water, 12.0 g of sodium dodecylbenzenesulfonate and 0.35 g of sodium persulfate, and the contents of the beaker were dissolved with stirring and treated by a homomixer for 10 min, thereby preparing an emulsified product. The thus prepared emulsified product was charged into the dropping funnel, and added dropwise into the four-necked flask at a constant rate over 3 h. After completion of the dropping, the resulting reaction mixture was aged for 2 h. After cooled to room temperature, the reaction mixture was filtered through a 200-mesh wire screen to obtain a resin dispersion (T1). The volume-median particle size of resin particles in the thus obtained resin dispersion (T1) as well as the solid content, pH value and glass transition point thereof are shown in Table 7.

TABLE 7

| | Resin Dispersion Production Examples | | | |
|---|---|---|---|---|
| | 16 | 17 | 15 | 18 |
| Resin dispersion | Q2 | R2 | S1 | T1 |
| Resin dispersion | | | | |
| Resin dispersion | Q1 | R1 | | |
| Amount (g) | 600 | 700 | | |
| Resin (A), etc. | | | | |
| Resin | q | r | s | PhEA-St** |
| (a)/[(b) + (c)] (wt %) | 59/41 | 61/39 | 100/0 | |
| Oxazoline compound*2 (g) | 99 | 65 | | |
| Deionized water (g) | 48 | 0 | | |
| Volume-median particle size (nm) | 337 | 142 | 104 | 108 |
| Solid content (wt %) | 35.6 | 37.7 | 33.4 | 25.3 |
| Tg of resin in resin dispersion (° C.) | 54 | 58 | 38 | −15 |
| pH | 9.0 | 9.1 | 8.0 | 2.3 |

Note
*2"EPOCROSS WS-700"
**PhEA-St: Phenoxyethyl acrylate-styrene

Examples 7 to 27 and Comparative Examples 5 and 6

Production of Thermal Transfer Image-Receiving Sheets

The respective components for intermediate layer as shown in Table 8 were mixed with each other at 45° C. with the formulations as shown in Table 8 to prepare intermediate layer coating solutions. The thus prepared coating solutions were respectively applied onto a synthetic paper "YUPO FGS-250" (thickness: 250 μm; basis weight: 200 g/m$^2$) using a wire bar such that a coating amount thereof after dried was 20.0 g/m$^2$, and then dried at 25° C. for 5 min, thereby obtaining intermediate layer-coated sheets.

In addition, the respective components for dye receptor layer as shown in Table 8 were mixed with each other at 25° C. with the formulations as shown in Table 8 to prepare dye receptor layer coating solutions (A2) to (R2). The thus prepared coating solutions were respectively applied onto the intermediate layer-coated sheet using a wire bar such that a coating amount thereof after dried was 5.0 g/m$^2$, and then dried at 50° C. for 2 min, thereby obtaining thermal transfer image-receiving sheets. Next, a gradation pattern of respective colors including black (K), yellow (Y), magenta (M), cyan (C), green (G), red (R) and blue (B) was printed onto the thus obtained thermal transfer image-receiving sheet using a commercially available sublimation-type printer ("SELPHY ES-2" available from Canon Corp.). The thus printed gradation patterns were respectively evaluated for a dyeability (printing sensitivity; maximum density) and a light fastness by the following methods. In addition, a black solid image having a size of 5×5 cm was continuously printed on the sheets to evaluate a releasability (heat fusibility) of the respective thermal transfer image-receiving sheets from an ink ribbon upon printing as well as occurrence of cracks on a surface of the printed images by the following methods. The results are shown in Table 8. Meanwhile, a gelatin available from Nitta Gelatin Inc., was used as the gelatin in the respective intermediate layer coating solutions and dye receptor layer coating solutions, and the viscosity, jelly strength and isoionic point thereof are shown in Table 9.

Evaluation Methods (Dyeability: Maximum Density)

The dyeability was evaluated by the same method as described above in Examples 1 to 6.

(Releasability: Heat Fusibility)

The releasability was determined from a sound generated when peeling an ink ribbon from the dye image-receiving sheet upon continuous printing of a black solid image according to the following ratings.

A: Peelable without any strange sound.

B: Peelable with slight strange sound.

C: Hardly peelable owing to heat fusion.

(Cracks on Surface of Printed Images)

The surface of the printed black solid image was observed by naked eyes and divided into ten portions in each of longitudinal and lateral directions to form 100 sections (size of each section: 0.5×0.5 cm). The occurrence of cracks on the printed image was evaluated by the number of the sections having any cracks according to the following ratings.

A: No cracks were observed over a whole surface (all sections) of the printed portion.

B: Cracks were observed in one or 2 sections of the printed portion.

C: Cracks were observed in 3 or more sections of the printed portion.

(Light Fastness)

The light fastness test was carried out using a xenon weather meter under the following conditions.

Illumination tester: "SX75" available from Suga Test Instruments Co., Ltd.

Light source: Xenon lamp

Filter: Inside: Quartz filter; Outside: #275

Panel temperature: 50° C.

Humidity inside of vessel: 35 to 50% RH

Illumination intensity: 50 (W/m$^2$) as the value measured at a wavelength of 300 to 400 (nm)

Cumulative illumination intensity: 10000 (kJ/m$^2$) as the cumulative value integrated over a wavelength range of 300 to 400 (nm)

Change in hue:

An optical reflection density of each of black (K), yellow (Y), magenta (M), cyan (C), green (G), red (R) and blue (B) images on the printed gradation pattern was measured using an optical densitometer (measured by a Gretag densitometer). At the step where the optical reflection density before irradiated with light was near 1.0, the L*, a* and b* values before and after irradiated with light were measured using a color/color-difference meter (measured by a Gretag densitometer), and a change in hue was calculated from the measured values according to the following formula to evaluate a light fastness of the printed images of black (K) and the respective chromatic colors. Meanwhile, the "black (K)+chromatic colors" appearing in the Tables means a sum of amounts of change in hue of the black (K), yellow (Y), magenta (M), cyan (C), green (G), red (R) and blue (B) colors.

$$\text{Change in hue}=[(a^*_1-a^*_2)^2+(b^*_1-b^*_2)^2]^{1/2}$$

wherein $L^*_1$, $a^*_1$ and $b^*_1$ respectively represent L*, a* and b* values before irradiated with light; and $L^*_2$, $a^*_2$ and $b^*_2$ respectively represent L*, a* and b* values after irradiated with light.

TABLE 8

| | | Examples 7 | 8 | 9 | 10 | 11 |
|---|---|---|---|---|---|---|
| **Intermediate layer coating solution** | | | | | | |
| Hollow particles (g) | Nipol MH8101*4 | 24 | 24 | 24 | 24 | 24 |
| Water-soluble polymer (g) | Gelatin | G0723K | G0723K | G0723K | G0723K | G0723K |
| | Amount (g) | 1.4 | 1.4 | 1.4 | 1.4 | 1.4 |
| Water (g) | Deionized water | 12.6 | 12.6 | 12.6 | 12.6 | 12.6 |
| **Dye receptor layer coating solution** | | | | | | |
| Coating solution | | Q31 | R31 | R32 | R33 | R34 |
| **Resin dispersion** | | | | | | |
| Resin (A), etc. | Resin dispersion | Q2 | R2 | R2 | R2 | R2 |
| | Amount (g) | 7 | 7 | 7 | 8 | 9 |
| | Resin | q | r | r | r | r |
| | (a)/[(b) + (c)] (wt %) | 59/41 | 61/39 | 61/39 | 61/39 | 61/39 |
| | Tg (° C.) | 54 | 58 | 58 | 58 | 58 |
| Resin (B), etc. | Resin dispersion | V278*7 | V278*7 | T1 | V278*7 | V278*7 |
| | Amount (g) | 3 | 3 | 3 | 2 | 1 |
| | Resin | VC-Ac | VC-Ac | PhEA-St | VC-Ac | VC-Ac |
| | Tg (° C.) | 39 | 39 | −15 | 39 | 39 |
| Film-forming agent (g) | Gelatin G0723K | 0.05 | 0.05 | 0.05 | 0.05 | 0.05 |
| Releasing agent (g) | KF615A*3 | 0.15 | 0.15 | 0.15 | 0.15 | 0.15 |
| Difference in Tg between resins in dye receptor layer (° C.) | | 15 | 19 | 73 | 19 | 19 |
| **Evaluation** | | | | | | |
| Dyeability (maximum density) | | 1.76 | 1.84 | 1.83 | 1.83 | 1.79 |
| Releasability (black solid image printing) | Peeling sound upon printing | A | A | B | A | A |
| | Cracks on surface of printed image | A | A | A | A | B |
| Light fastness (black + chromatic colors) | | 32 | 26 | 22 | 29 | 34 |

| | | Examples 12 | Examples 13 | Comparative Examples 5 | Comparative Examples 6 |
|---|---|---|---|---|---|
| **Intermediate layer coating solution** | | | | | |
| Hollow particles (g) | Nipol MH8101*4 | 24 | | 24 | 24 |
| Water-soluble polymer (g) | Gelatin | G0723K | G0723K | G0723K | G0723K |
| | Amount (g) | 1.4 | 1.4 | 1.4 | 1.4 |
| Water (g) | Deionized water | 12.6 | 12.6 | 12.6 | 12.6 |
| **Dye receptor layer coating solution** | | | | | |
| Coating solution | | Q32 | Q33 | V31 | V32 |
| **Resin dispersion** | | | | | |
| Resin (A), etc. | Resin dispersion | Q2 | Q2 | | |
| | Amount (g) | 10 | 7 | | |
| | Resin | q | q | | |
| | (a)/[(b) + (c)] (wt %) | 59/41 | 59/41 | | |
| | Tg (° C.) | 54 | 54 | | |
| Resin (B), etc. | Resin dispersion | | V278*7 | V900*6/V271*8 = 7/3 | V900*6/V278*7 = 7/3 |
| | Amount (g) | | 3 | 10 | 10 |
| | Resin | | VC-Ac | VC-Ac | VC-Ac |
| | Tg (° C.) | | 39 | 78/−5 | 78/39 |
| Film-forming agent (g) | Gelatin G0723K | 0.05 | 0.05 | 0.05 | 0.05 |
| Releasing agent (g) | KF615A*3 | 0.15 | 0.15 | 0.15 | 0.15 |

TABLE 8-continued

| | | | | | |
|---|---|---|---|---|---|
| Difference in Tg between resins in dye receptor layer (° C.) | | — | 15 | 83 | 39 |
| Evaluation | | | | | |
| Dyeability (maximum density) | | 1.56 | 1.59 | — | 1.83 |
| Releasability (black solid image printing) | Peeling sound upon printing | A | B | C | B |
| | Cracks on surface of printed image | B | A | B | A |
| Light fastness (black + chromatic colors) | | 63 | 23 | — | 43 |

| | | Examples | | | | |
|---|---|---|---|---|---|---|
| | | 14 | 15 | 16 | 17 | 18 |
| Intermediate layer coating solution | | | | | | |
| Hollow particles | Nipol MH | 8101*4 | 8101*4 | 8101*4 | 8101*4 | MH5055*5 |
| | Amount (g) | 24 | 24 | 24 | 24 | 24 |
| Water-soluble polymer | Gelatin | G0723K | G0808K | G08873K | G0723K | G0723K |
| | Amount (g) | 1.4 | 1.4 | 1.4 | 1.4 | 1.4 |
| Water (g) | Deionized water | 12.6 | 12.6 | 12.6 | 12.6 | 12.6 |
| Dye receptor layer coating solution | | | | | | |
| Coating solution | | R35 | R36 | R37 | R38 | R39 |
| Resin dispersion | | | | | | |
| Resin (A), etc. | Resin dispersion | R2 | R2 | R2 | R2 | R2 |
| | Amount (g) | 7 | 7 | 7 | 7 | 7 |
| | Resin | r | r | r | r | r |
| | (a)/[(b) + (c)] (wt %) | 61/39 | 61/39 | 61/39 | 61/39 | 61/39 |
| | Tg (° C.) | 58 | 58 | 58 | 58 | 58 |
| Resin (B), etc. | Resin dispersion | S1 | S1 | S1 | S1 | S1 |
| | Amount (g) | 3 | 3 | 3 | 3 | 3 |
| | Resin | s | s | s | s | s |
| | Tg (° C.) | 38 | 38 | 38 | 38 | 38 |
| Film-forming agent | Gelatin | G0723K | G0723K | G0723K | G0726K | G0723K |
| | Amount (g) | 0.05 | 0.05 | 0.05 | 0.05 | 0.05 |
| Releasing agent (g) | KF615A*3 | 0.15 | 0.15 | 0.15 | 0.15 | 0.15 |
| Difference in Tg between resins in dye receptor layer (° C.) | | 20 | 20 | 20 | 20 | 20 |
| Evaluation | | | | | | |
| Dyeability (maximum density) | | 1.85 | 1.83 | 1.81 | 1.78 | 1.77 |
| Releasability (black solid image printing) | Peeling sound upon printing | A | A | A | A | A |
| | Cracks on surface of printed image | A | A | A | B | A |
| Light fastness (black + chromatic colors) | | 29 | 29 | 30 | 29 | 32 |

| | | Examples | | | | |
|---|---|---|---|---|---|---|
| | | 19 | 20 | 21 | 22 | 23 |
| Intermediate layer coating solution | | | | | | |
| Hollow particles | Nipol MH | 8101*4 | 8101*4 | 8101*4 | 8101*4 | 8101*4 |
| | Amount (g) | 24 | 24 | 24 | 24 | 24 |
| Water-soluble polymer | Gelatin | G0723K | G0723K | G0889K | G0723K | G0723K |
| | Amount (g) | 1.4 | 1.4 | 1.4 | 1.4 | 1.4 |
| Water (g) | Deionized water | 12.6 | 12.6 | 12.6 | 12.6 | 12.6 |

TABLE 8-continued

| | | | | | | |
|---|---|---|---|---|---|---|
| Dye receptor layer coating solution | | | | | | |
| Coating solution | | R40 | R41 | R42 | R43 | R44 |
| Resin dispersion | | | | | | |
| Resin (A), etc. | Resin dispersion | R2 | R2 | R2 | R2 | R2 |
| | Amount (g) | 7 | 7 | 7 | 7 | 7 |
| | Resin | r | r | r | r | r |
| | (a)/[(b) + (c)] (wt %) | 61/39 | 61/39 | 61/39 | 61/39 | 61/39 |
| | Tg (° C.) | 58 | 58 | 58 | 58 | 58 |
| Resin (B), etc. | Resin dispersion | S1 | S1 | S1 | S1 | S1 |
| | Amount (g) | 3 | 3 | 3 | 3 | 3 |
| | Resin | s | s | s | s | s |
| | Tg (° C.) | 38 | 38 | 38 | 38 | 38 |
| Film-forming agent | Gelatin | G0723K | G0723K | G0723K | G0725K | G0727K |
| | Amount (g) | 0.15 | 0.35 | 0.05 | 0.05 | 0.05 |
| Releasing agent (g) | KF615A*3 | 0.15 | 0.15 | 0.15 | 0.15 | 0.15 |
| Difference in Tg between resins in dye receptor layer (° C.) | | 20 | 20 | 20 | 20 | 20 |
| Evaluation | | | | | | |
| Dyeability (maximum density) | | 1.75 | 1.76 | 1.80 | 1.74 | 1.80 |
| Releasability (black solid image printing) | Peeling sound upon printing | A | A | A | A | A |
| | Cracks on surface of printed image | A | A | B | B | B |
| Light fastness (black + chromatic colors) | | 31 | 33 | 35 | 35 | 35 |

| | | Examples | | | |
|---|---|---|---|---|---|
| | | 24 | 25 | 26 | 27 |
| Intermediate layer coating solution | | | | | |
| Hollow particles | Nipol MH | 8101*4 | 8101*4 | 8101*4 | 8101*4 |
| | Amount (g) | 24 | 24 | 24 | 24 |
| Water-soluble polymer | Gelatin | G0723K | G0723K | G0723K | G0723K |
| | Amount (g) | 1.4 | 1.4 | 1.4 | 1.4 |
| Water (g) | Deionized water | 12.6 | 12.6 | 12.6 | 12.6 |
| Dye receptor layer coating solution | | | | | |
| Coating solution | | R45 | R46 | R47 | R48 |
| Resin dispersion | | | | | |
| Resin (A), etc. | Resin dispersion | R2 | R2 | R2 | R2 |
| | Amount (g) | 7 | 7 | 7 | 7 |
| | Resin | r | r | r | r |
| | (a)/[(b) + (c)] (wt %) | 61/39 | 61/39 | 61/39 | 61/39 |
| | Tg (° C.) | 58 | 58 | 58 | 58 |
| Resin (B), etc. | Resin dispersion | S1 | S1 | S1 | S1 |
| | Amount (g) | 3 | 3 | 3 | 3 |
| | Resin | s | s | s | s |
| | Tg (° C.) | 38 | 38 | 38 | 38 |
| Film-forming agent | Gelatin | G0808K | G0887K | G0888K | G0889K |
| | Amount (g) | 0.05 | 0.05 | 0.05 | 0.05 |
| Releasing agent (g) | KF615A*3 | 0.15 | 0.15 | 0.15 | 0.15 |
| Difference in Tg between resins in dye receptor layer (° C.) | | 20 | 20 | 20 | 20 |
| Evaluation | | | | | |
| Dyeability (maximum density) | | 1.78 | 1.75 | 1.74 | 1.76 |
| Releasability (black solid image printing) | Peeling sound upon printing | A | A | A | A |
| | Cracks on surface of printed image | B | B | B | B |

TABLE 8-continued

| | | | | |
|---|---|---|---|---|
| Light fastness (black + chromatic colors) | 36 | 33 | 31 | 32 |

Note
*[3]KF615A (polyether-modified silicone; available from Shin-Etsu Chemical Co., Ltd.)
*[4]"Nipol MH8101" (available from Zeon Corporation; dispersion of hollow particles (material name) styrene-acryl copolymer; hollowness rate: 50%; solid content: 26 wt %)
*[5]"Nipol MH5055" (available from Zeon Corporation; dispersion of hollow particles (material name) styrene-acryl copolymer; hollowness rate: 55%; solid content: 30 wt %; diluted to 26 wt % with ion-exchanged water)
*Solid concentrations of all resin dispersions were adjusted to 30 wt %
*[6]"VINYBRANE 900" (available from Nissin Chemical Industry, Co., Ltd.; dispersion of vinyl chloride-acryl polymer (VC-Ac); Tg = 78° C.)
*[7]"VINYBRANE 278" (available from Nissin Chemical Industry, Co., Ltd.; dispersion of vinyl chloride-acryl polymer (VC-Ac); Tg = 39° C.)
*[8]"VINYBRANE 271" (available from Nissin Chemical Industry, Co., Ltd.; dispersion of vinyl chloride-acryl polymer (VC-Ac); Tg = −5° C.)
**PhEA-St: Phenoxyethyl acrylate-styrene

TABLE 9

| Gelatin | Viscosity (mPa · s) | Jelly strength | Isoionic point |
|---|---|---|---|
| G-0723K | 4.4 | 256 | 5 |
| G-0725K | 3.0 | 295 | 7 |
| G-0726K | 5.1 | 205 | 4 |
| G-0727K | 5.0 | 163 | 4 |
| G-0808K | 4.2 | 200 | 5 |
| G-0887K | 2.4 | 245 | 7 |
| G-0888K | 2.4 | 194 | 7 |
| G-0889K | 1.8 | 158 | 7 |

The invention claimed is:

1. A thermal transfer image-receiving sheet comprising a substrate and a dye receptor layer comprising a resin (A) obtained by a process comprising addition polymerizing and condensation polymerizing (a) raw monomers of a polyester, (b) a raw monomer of an addition polymer-based resin comprising at least one compound selected from the group consisting of styrene and styrene derivatives and (c) at least one compound selected from the group consisting of acrylic acid, methacrylic acid and derivatives of these acids, wherein the raw monomers (a) of a polyester comprise a carboxylic acid component and an alcohol component, which alcohol component comprises 80 mol % or more of an alkyleneoxide adduct of 2,2-bis(4-hydroxyphenyl)propane represented by formula (I):

(I)

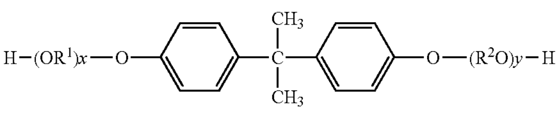

wherein $R^1O$ and $R^2O$ are respectively an oxyethylene group or an oxypropylene group; and x and y are respectively a positive number with the proviso that a sum of x and y is from 2 to 7 on the average, in which the $R^1O$ groups in the number of x may be the same or different and the $R^2O$ groups in the number of y may be the same or different.

2. The thermal transfer image-receiving sheet according to claim 1, wherein a weight ratio of the raw monomers (a) of a polyester to a sum of the raw monomer (b) of an addition polymer-based resin comprising at least one compound selected from the group consisting of styrene and styrene derivatives and the at least one compound (c) selected from the group consisting of acrylic acid, methacrylic acid and derivatives of these acids [(a)/[(b)+(c)]] is from 20/80 to 80/20.

3. The thermal transfer image-receiving sheet according to claim 1, wherein the carboxylic acid component comprises a dicarboxylic acid component comprising 50 mol % or more of an aromatic dicarboxylic acid.

4. The thermal transfer image-receiving sheet according to claim 1, wherein the sheet comprises the dye receptor layer comprising the resin (A) produced by a process comprising:

(1) mixing the raw monomers (a) of a polyester, the raw monomer (b) of an addition polymer-based resin comprising at least one compound selected from the group consisting of styrene and styrene derivatives and the at least one compound (c) selected from the group consisting of acrylic acid, methacrylic acid and derivatives of these acids with each other to form a mixture;

(2) addition polymerizing the resulting mixture to obtain an addition polymer-based resin component comprising a functional group derived from the compound (c); and (3) polycondensing the raw monomers (a) of a polyester and the addition polymer-based resin component comprising a functional group derived from the compound (c) to react the raw monomer (a) with the addition polymer-based resin component.

5. The thermal transfer image-receiving sheet according to claim 1, wherein the dye receptor layer comprises a water-soluble polymer.

6. A process for producing the thermal transfer image-receiving sheet as defined in claim 1, comprising forming the dye receptor layer on a substrate using a coating solution comprising a resin (A) obtained by a process comprising addition polymerizing and condensation polymerizing (a) raw monomers of a polyester, (b) a raw monomer of an addition polymer-based resin comprising at least one compound selected from the group consisting of styrene and styrene derivatives and (c) at least one compound selected from the group consisting of acrylic acid, methacrylic acid and derivatives of these acids, wherein the raw monomers (a) of a polyester comprise a carboxylic acid component and an alcohol component, which alcohol component comprises 80 mol % or more of an alkyleneoxide adduct of 2,2-bis(4-hydroxyphenyl)propane represented by formula (I):

(I)

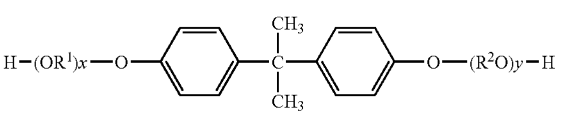

wherein $R^1O$ and $R^2O$ are respectively an oxyethylene group or an oxypropylene group; and x and y are respectively a positive number with the proviso that a sum of x and y is from 2 to 7 on the average, in which the $R^1O$ groups in the number of x may be the same or different and the $R^2O$ groups in the number of y may be the same or different.

7. The thermal transfer image-receiving sheet according to claim 1, wherein the sheet comprises a substrate, and an intermediate layer comprising a water-soluble polymer and hollow particles and the dye receptor layer which are successively present on the substrate in this order.

8. The thermal transfer image-receiving sheet according to claim 7, wherein the dye receptor layer is formed by applying a coating solution comprising a resin dispersion prepared by dispersing the resin (A) in an aqueous medium on the substrate or on the intermediate layer and then drying the applied coating solution.

9. The thermal transfer image-receiving sheet according to claim 8, wherein the coating solution comprises the resin dispersion to which a compound comprising an oxazoline group is further added.

10. The thermal transfer image-receiving sheet according to claim 7, wherein the dye receptor layer further comprises a resin (B) having a glass transition point that is different by 10 to 80° C. from that of the resin (A).

11. The thermal transfer image-receiving sheet according to claim 10, wherein a content of a propyleneoxide adduct in the alkyleneoxide adduct of 2,2-bis(4-hydroxyphenyl)propane is from 50 to 100 mol %.

12. The thermal transfer image-receiving sheet according to claim 10, wherein one of the resin (A) and the resin (B) is a resin having a glass transition point of 45° C. or lower, and the other of the resins is a resin having a glass transition point of 50° C. or higher.

13. A process for producing the thermal transfer image-receiving sheet as defined in claim 10, comprising:

(1) forming the intermediate layer comprising the water-soluble polymer and the hollow particles on the substrate; and (2) forming the dye receptor layer on the intermediate layer with a coating solution comprising the resin (A) and the resin (B).

14. The thermal transfer image-receiving sheet according to claim 1, wherein the dye receptor layer comprises a crosslinked resin obtained by crosslinking at least a part of the resin (A) with at least a part of a compound comprising an oxazoline group.

15. The thermal transfer image-receiving sheet according to claim 1, wherein the dye receptor layer is formed from a coating solution comprising a resin dispersion to which an compound comprising an oxazoline group is added.

16. A thermal transfer method comprising:

forming a dye receptor layer comprising the resin (A) as defined in claim 1 on a substrate to obtain a thermal transfer image-receiving sheet; and bringing a transfer sheet comprising a sublimable dye into pressure contact with a surface of the dye receptor layer of the thermal transfer image-receiving sheet under heating to transfer the dye to the surface and obtain a transferred image thereon.

17. A thermal transfer method comprising:

successively forming an intermediate layer comprising a water-soluble polymer and hollow particles and a dye receptor layer comprising the resin (A) as defined in claim 1 and a resin (B) having a glass transition point that is different by 10 to 80° C. from that of the resin (A), on a substrate in this order to obtain a thermal transfer image-receiving sheet; and pressure contacting a transfer sheet comprising a sublimable dye with a surface of the dye receptor layer of the thermal transfer image-receiving sheet under heating to transfer the dye to the surface and obtain a transferred image thereon.

* * * * *